May 15, 1951 R. W. JONES 2,552,792

TELEPHONE SYSTEM

Filed Oct. 18, 1947 12 Sheets-Sheet 1

INVENTOR.
ROY W. JONES

BY

Chas. M. Candy

ATTORNEY

INVENTOR.
ROY W. JONES
BY
Chas. W. Candy
ATTORNEY

May 15, 1951 R. W. JONES 2,552,792

TELEPHONE SYSTEM

Filed Oct. 18, 1947 12 Sheets-Sheet 3

INVENTOR.
ROY W. JONES

BY

Chas. Lu. Candy

ATTORNEY

May 15, 1951 R. W. JONES 2,552,792

TELEPHONE SYSTEM

Filed Oct. 18, 1947 12 Sheets-Sheet 4

INVENTOR.
ROY W. JONES

BY

Chas. W. Candy.

ATTORNEY

May 15, 1951 R. W. JONES 2,552,792

TELEPHONE SYSTEM

Filed Oct. 18, 1947 12 Sheets-Sheet 5

INVENTOR.
ROY W. JONES

BY Chas. W. Candy,
ATTORNEY

May 15, 1951 R. W. JONES 2,552,792

TELEPHONE SYSTEM

Filed Oct. 18, 1947 12 Sheets-Sheet 6

INVENTOR.
ROY W. JONES

BY Chas. W. Candy

ATTORNEY

May 15, 1951 R. W. JONES 2,552,792

TELEPHONE SYSTEM

Filed Oct. 18, 1947 12 Sheets-Sheet 7

INVENTOR.
ROY W. JONES

BY

Chas. W. Canfield

ATTORNEY

May 15, 1951 R. W. JONES 2,552,792

TELEPHONE SYSTEM

Filed Oct. 18, 1947 12 Sheets-Sheet 8

INVENTOR.
ROY W. JONES

BY Chas. W. Candy

ATTORNEY

INVENTOR.
ROY W. JONES
BY
ATTORNEY

INVENTOR.
ROY W. JONES
BY Chas. W. Candy
ATTORNEY

INVENTOR.
ROY W. JONES.
BY Chas. W. Candy
ATTORNEY

May 15, 1951 R. W. JONES 2,552,792

TELEPHONE SYSTEM

Filed Oct. 18, 1947 12 Sheets-Sheet 12

INVENTOR.
ROY W. JONES

BY Chas. Tw. Candy

ATTORNEY

Patented May 15, 1951

2,552,792

UNITED STATES PATENT OFFICE 2,552,792

TELEPHONE SYSTEM

Roy W. Jones, Rochester, N. Y., assignor to Automatic Electric Laboratories, Inc., Chicago, Ill., a corporation of Delaware Application October 18, 1947, Serial No. 780,612

42 Claims. (Cl. 179—18)

Figure 1:
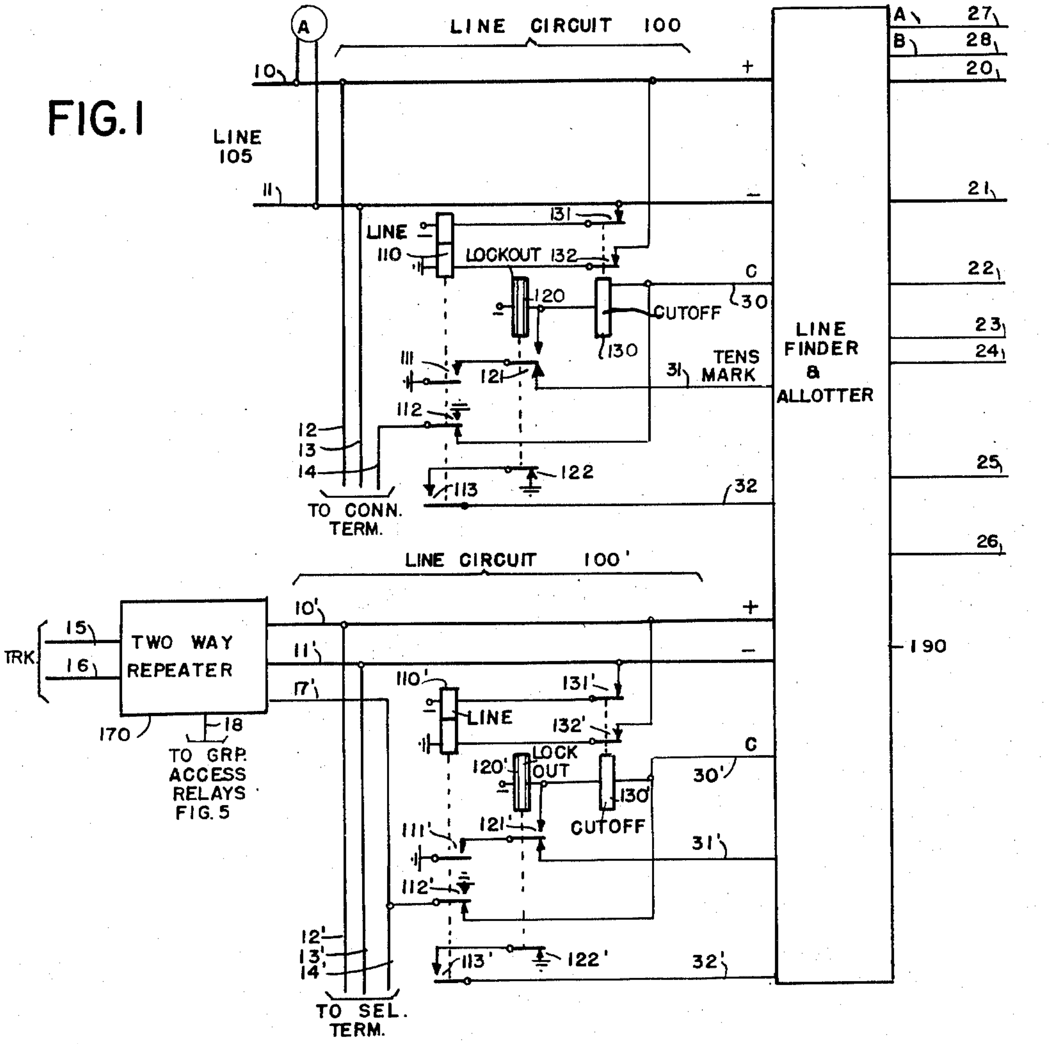

This invention relates in general to a telephone system, but more particularly to automatic telephone systems of the all-relay type similar to that described in the co-pending applications Serial Number 720,756 filed January 8, 1947, now Patent No. 2,535,764, granted December 26, 1950, and Serial Number 720,757 filed January 8, 1947.

Telephone systems of this type, while comparatively new, are known to be extremely fast in operation, and quite reliable in performance. They tend, however, to be high in cost, particularly in the larger sizes employing selectors, because of the very large number of relays required. This high cost has been, perhaps, the most important handicap encountered in the commercial exploitation of the all-relay system.

The principal method employed in the past to reduce the cost of this type of system has been to remove all control relays from the individual linefinders, and concentrate them in control units common to a plurality of linefinders, leaving in these latter units only the tens and unit relays for connecting them to the control equipment as and when required. More recent developments teach the use of trunk selecting equipment common to a plurality of selectors or connectors, rather than making such equipment an integral part of each switch.

The main purpose of the present invention is to continue this process, and still further reduce the cost of such systems, by removing a good portion of the remaining control relays from both the selectors and the connectors, and placing these relays in common control units accessible to plurality of said switches. Such arrangements are known in connection with Strowger switch systems and other machine switching systems, where, however, they have less utility, and in connection with Strowger systems at least, tend to reduce somewhat the inherent flexibility of this equipment.

One feature of my invention is, therefore, the provision of an all-relay connector from which have been removed, the pulsing, release, hold, back-bridge, counting, transfer, line testing, and ringing control relays, as well as dial, busy and reverting call tone, features normally included in each individual connector. Thus the connectors in this system consist of only the tens, units and units switching relays and two control relays.

Another feature of my invention is the provision of an all-relay selector which concentrates most of the functions normally contained in both selectors and connectors, and has the pulsing, release, hold, back-bridge, battery-reversing, busy testing, cut-through, timing, ringing, toll verification, and service restriction features as well as busy and reverting call tone.

Another feature of my invention is the use of register groups, each group common to a plurality of selectors and all register groups common to all connectors in the system. These registers receive the digits dialed and set-up the tens relays of the selector, store the tens digit of the connector, spill-over into the connector the tens digit and the units digit and set-up the ringing control in the selector.

Another feature is the short time that the register is held for a connection, thereby reducing the number of registers required for a system, and thus further reducing the cost.

Another feature is the use of the connector access relays, consisting of one relay individual to each connector in the system, which allows the setting-up of the connector tens and units relays by the register in a minimum amount of time, therefore, allowing the use of a common set-up path to all connectors from all of the registers, thereby further reducing the cost.

Another feature of the invention is the forced release of all common control, linefinder, selector and connector units if held for longer than a certain fixed maximum time interval.

Another feature of the invention lies in the association of two or more common control units with any given group of selectors, all said control units being common to all connectors, and the use of said control units in rotation.

Another feature of the invention is the reverting means whereby the counting relays of the register are released and prepared to receive further impulses of other digits.

Other objects and features of the invention will be apparent from the application and claims which follow, considered in conjunction with the associated drawings comprising Figures 1 to 15 inclusive, which show one embodiment of the invention as applied to a 1000 line system having facilities for multi-party lines requiring either code or harmonic signaling. Facilities for making reverting calls are therefore provided; also one digit trunk selection and toll verification features are provided. It will be understood that the arrangement shown is but one embodiment of the invention, and that various modifications and re-arrangements are possible, without departing from the scope of the invention.

Figure 15:
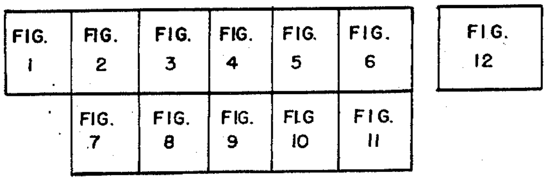
Figure 2:
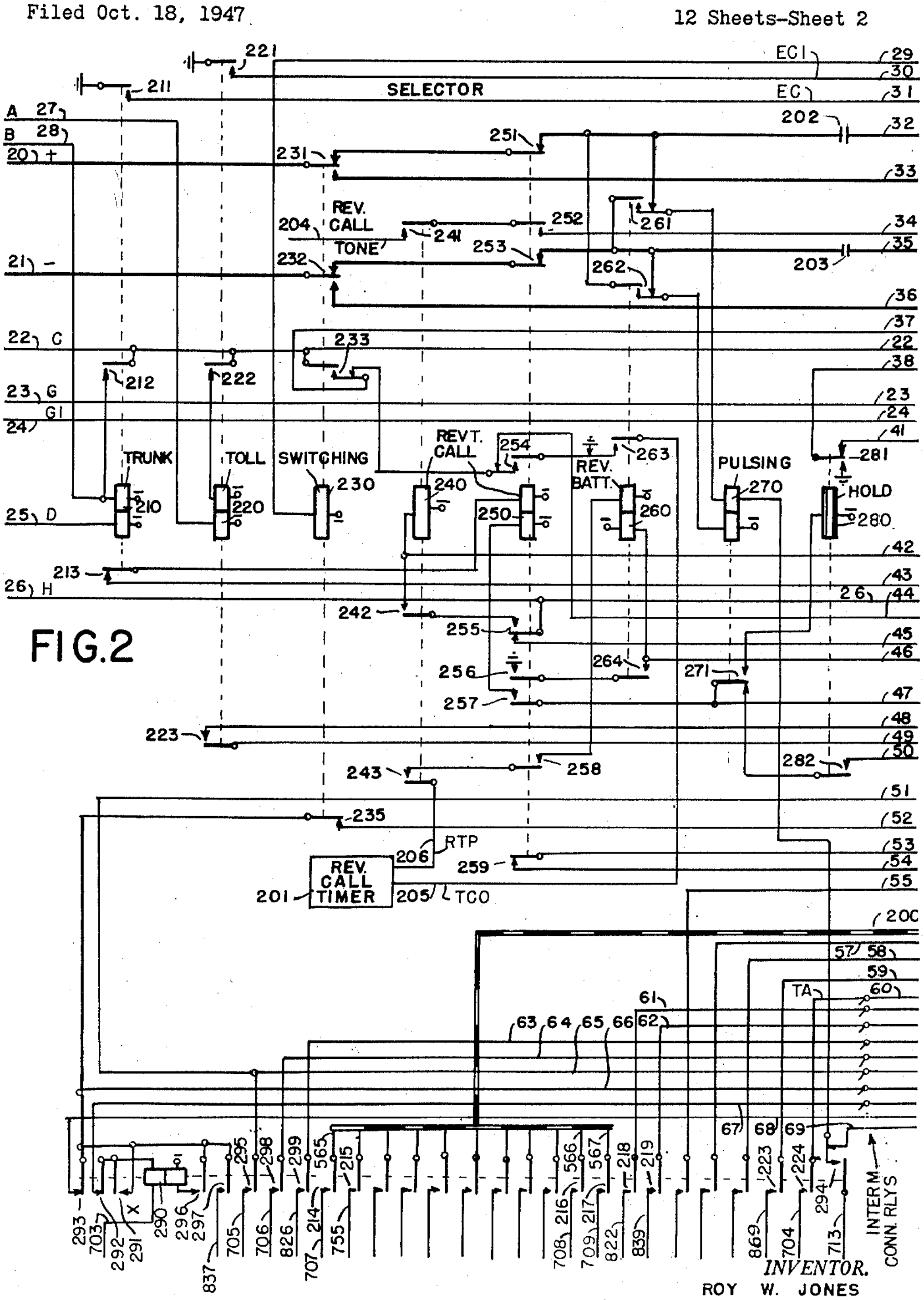
Figure 3:
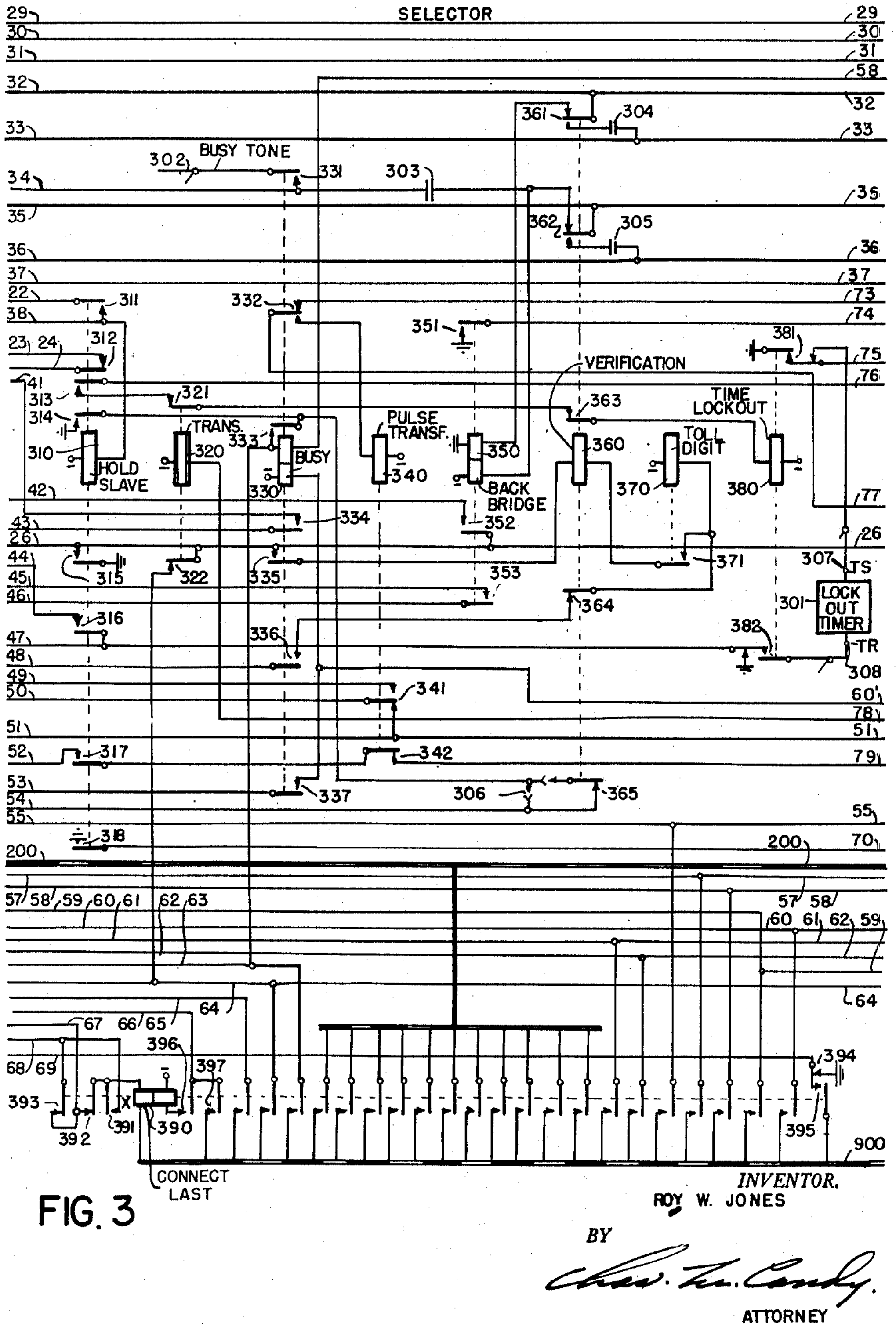
Figure 4:
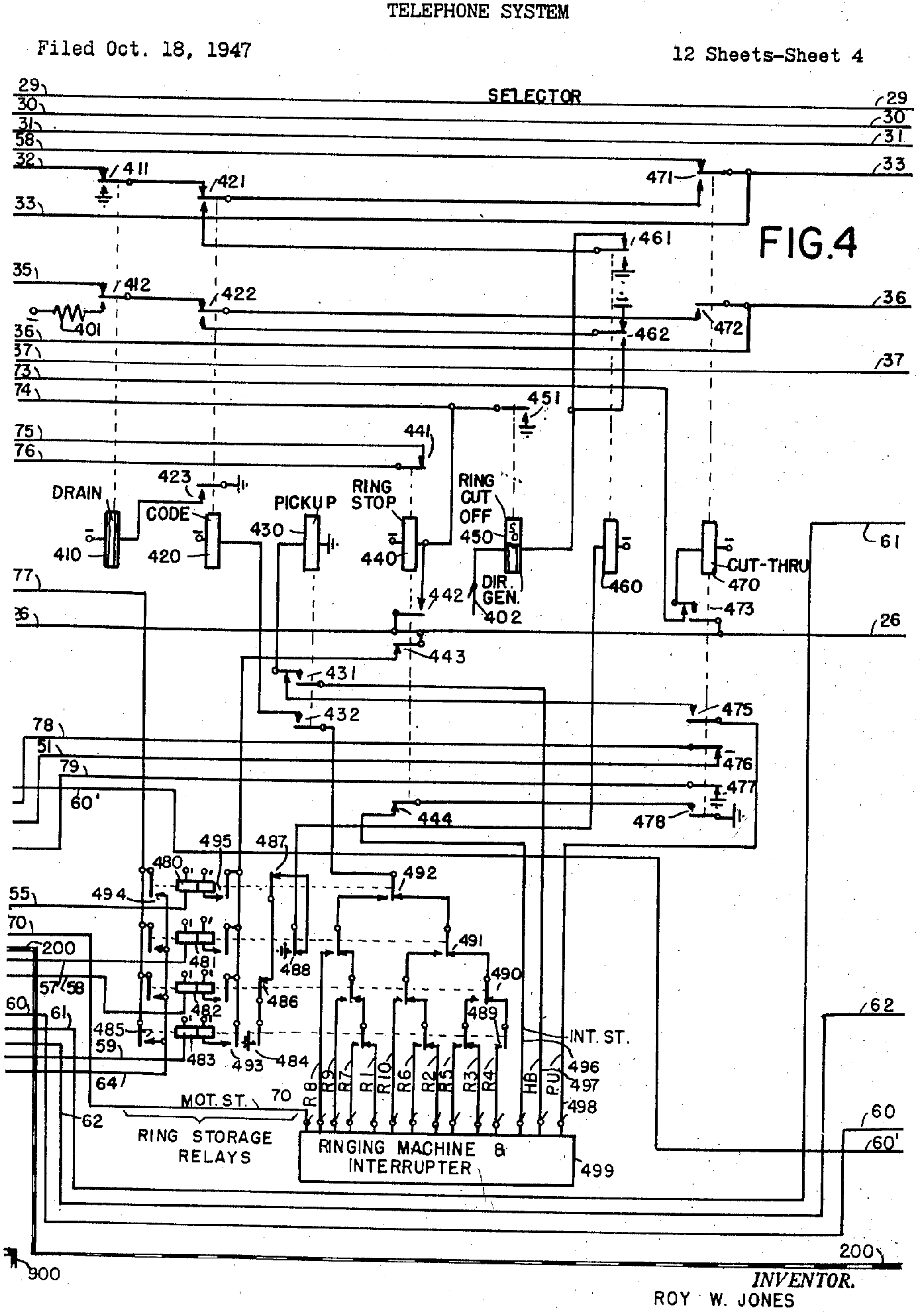

With reference to the drawings, Figures 1 to 11, when arranged as indicated in Figure 15, with the adjoining conductors properly aligned, represent a sufficient amount of the essential parts of the system to enable the operation thereof to be thoroughly understood. Thus, Figure 1 represents the line and linefinder equipment, and the finder allotter. Similarly, Figures 2 to 5 inclusive show a selector, with Figures 2 to 4 representing the selector control relays and Figure 5 the selector tens and units relays.

Figure 13:
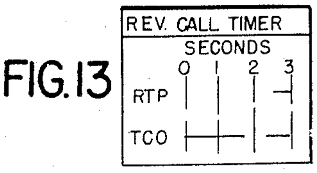
Figure 14:
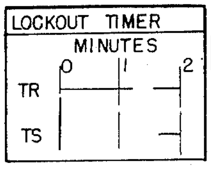
Figure 6:
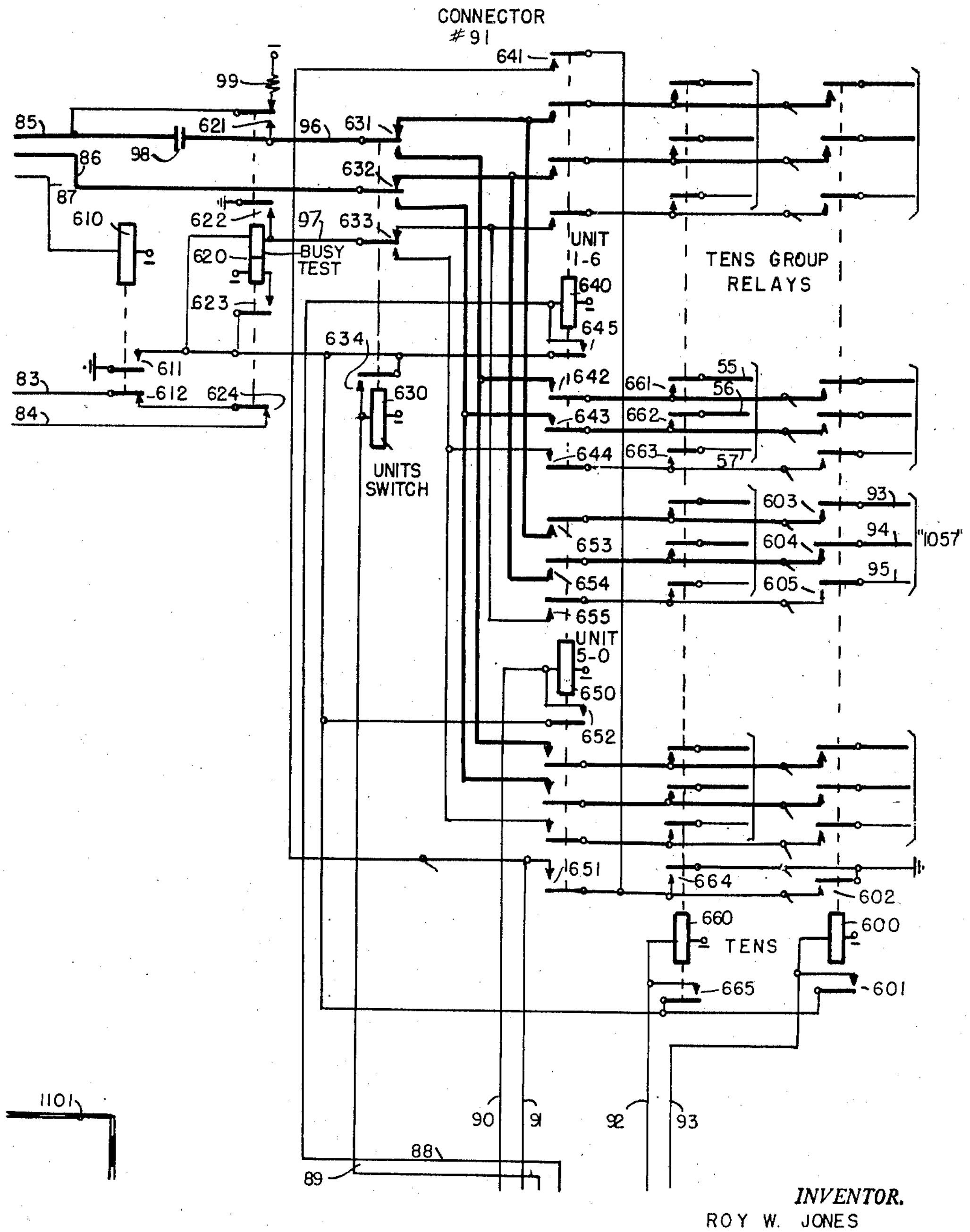
Figure 7:
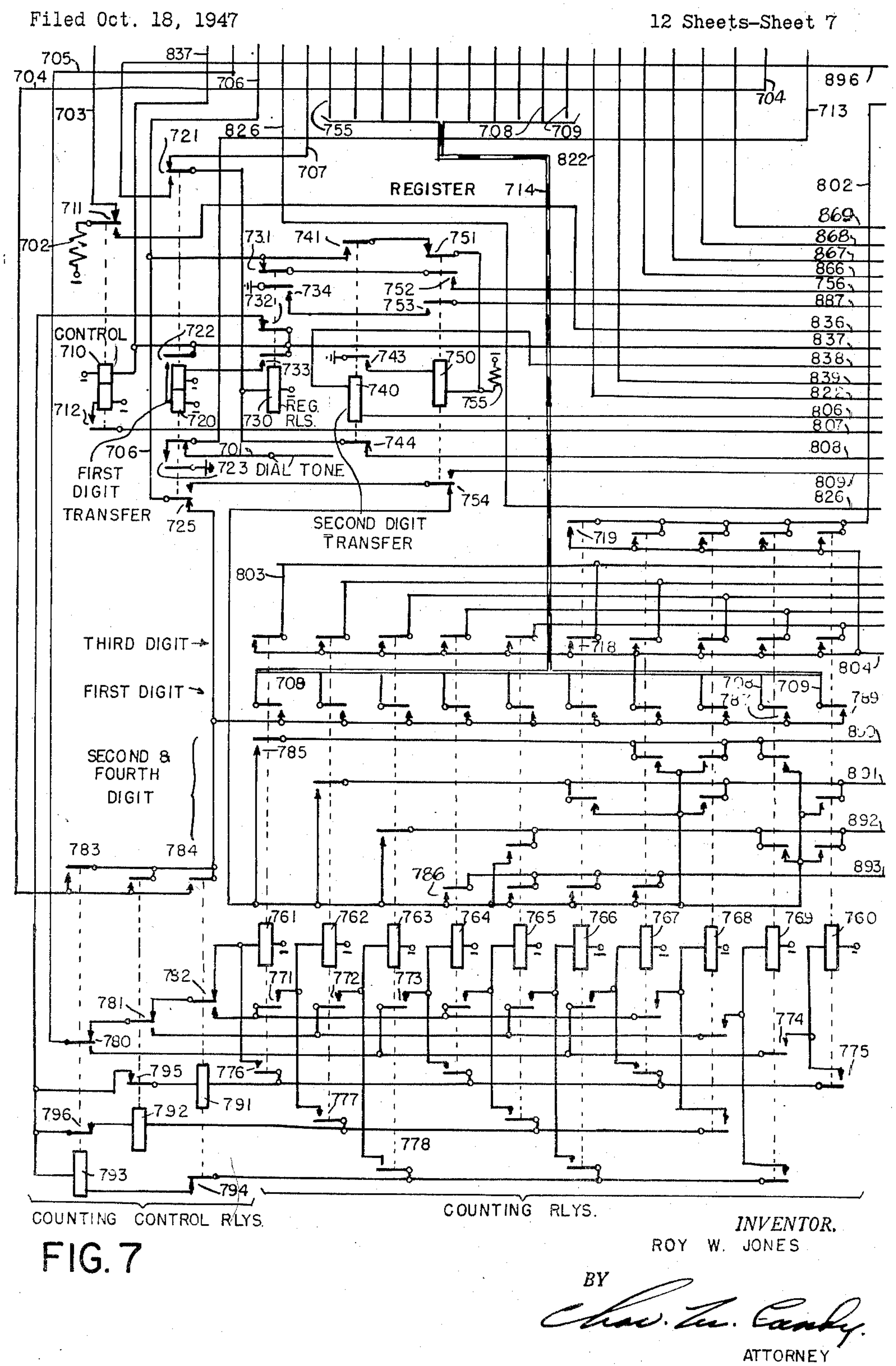
Figure 8:
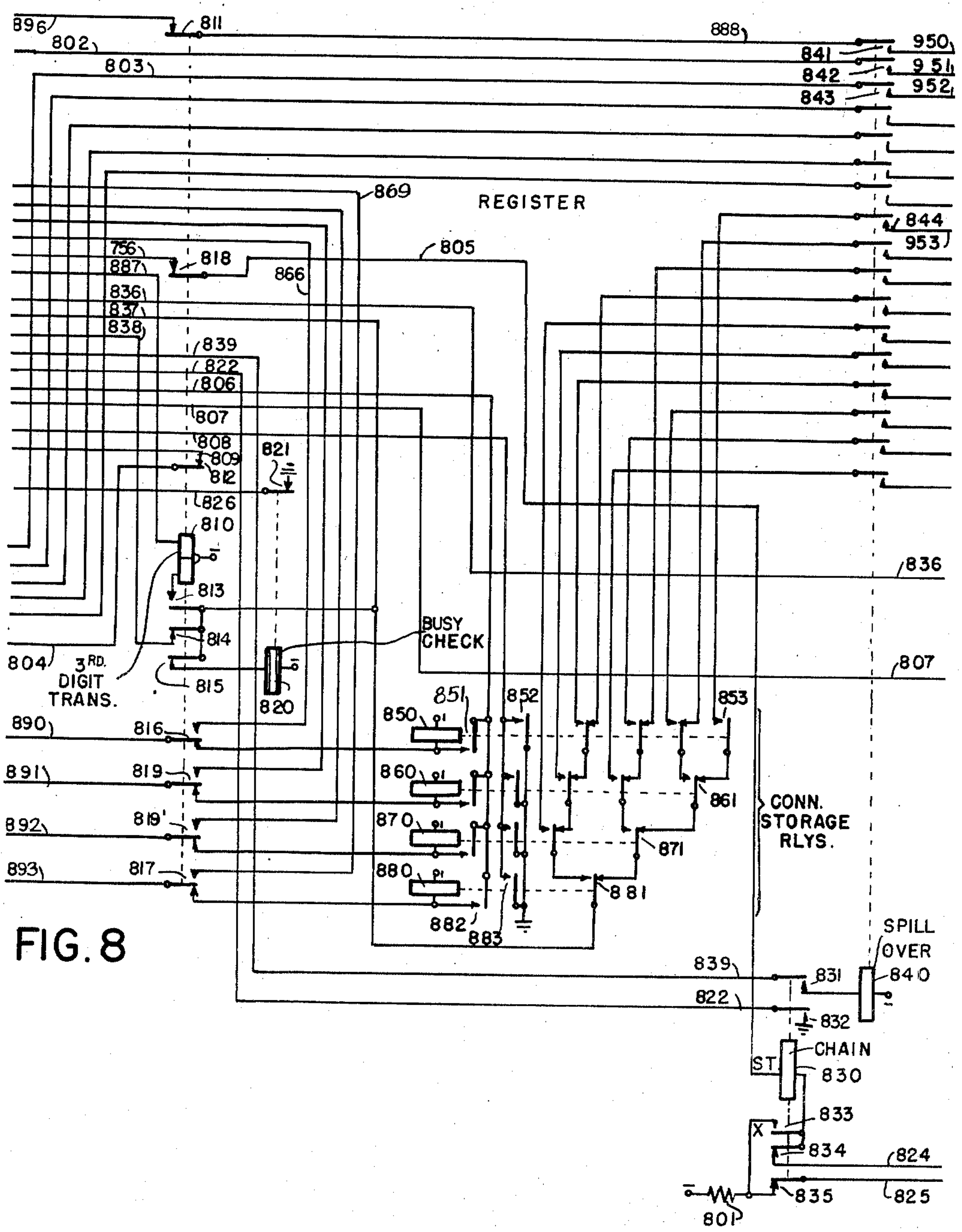
Figure 9:
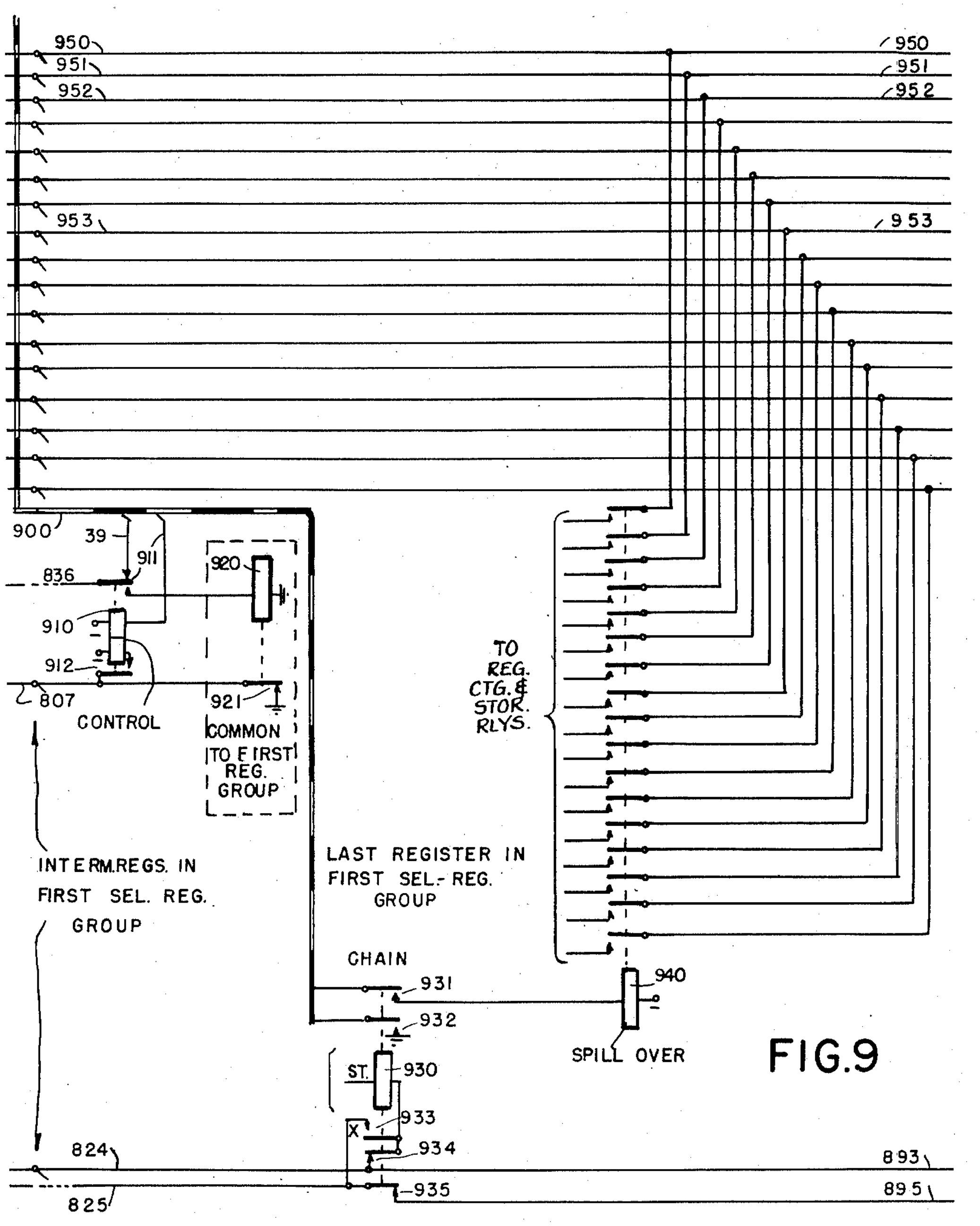
Figure 10:
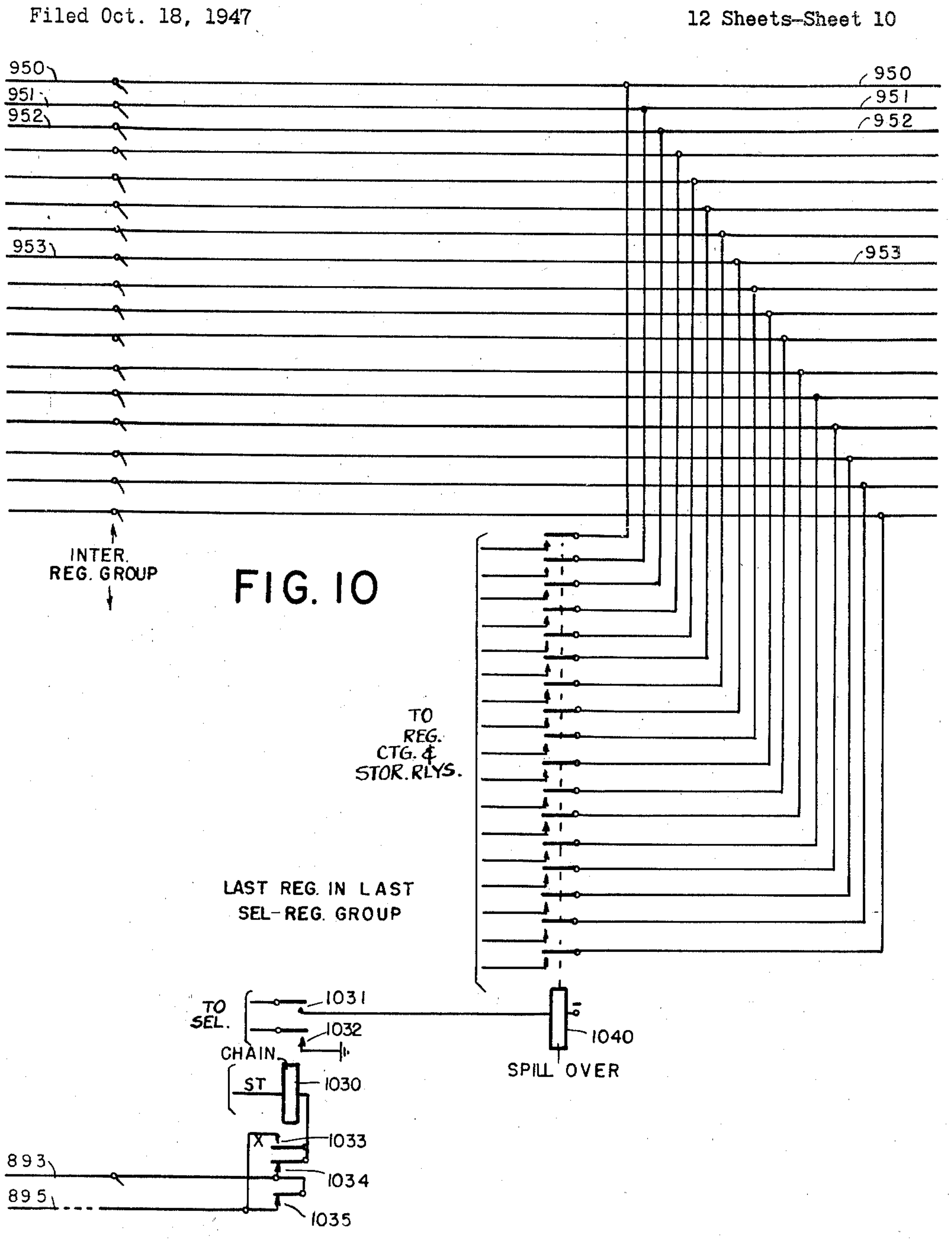
Figure 11:
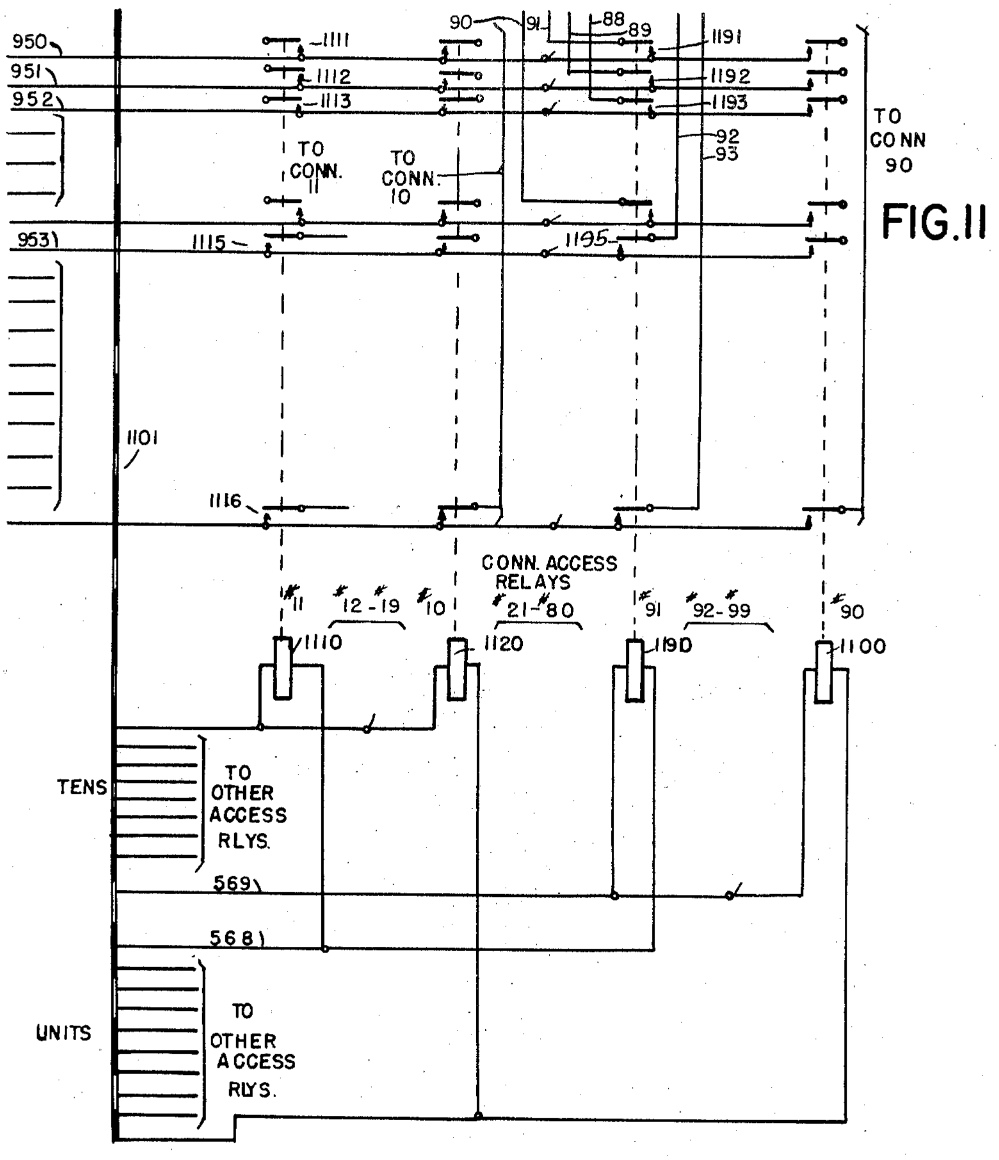
Figure 12:
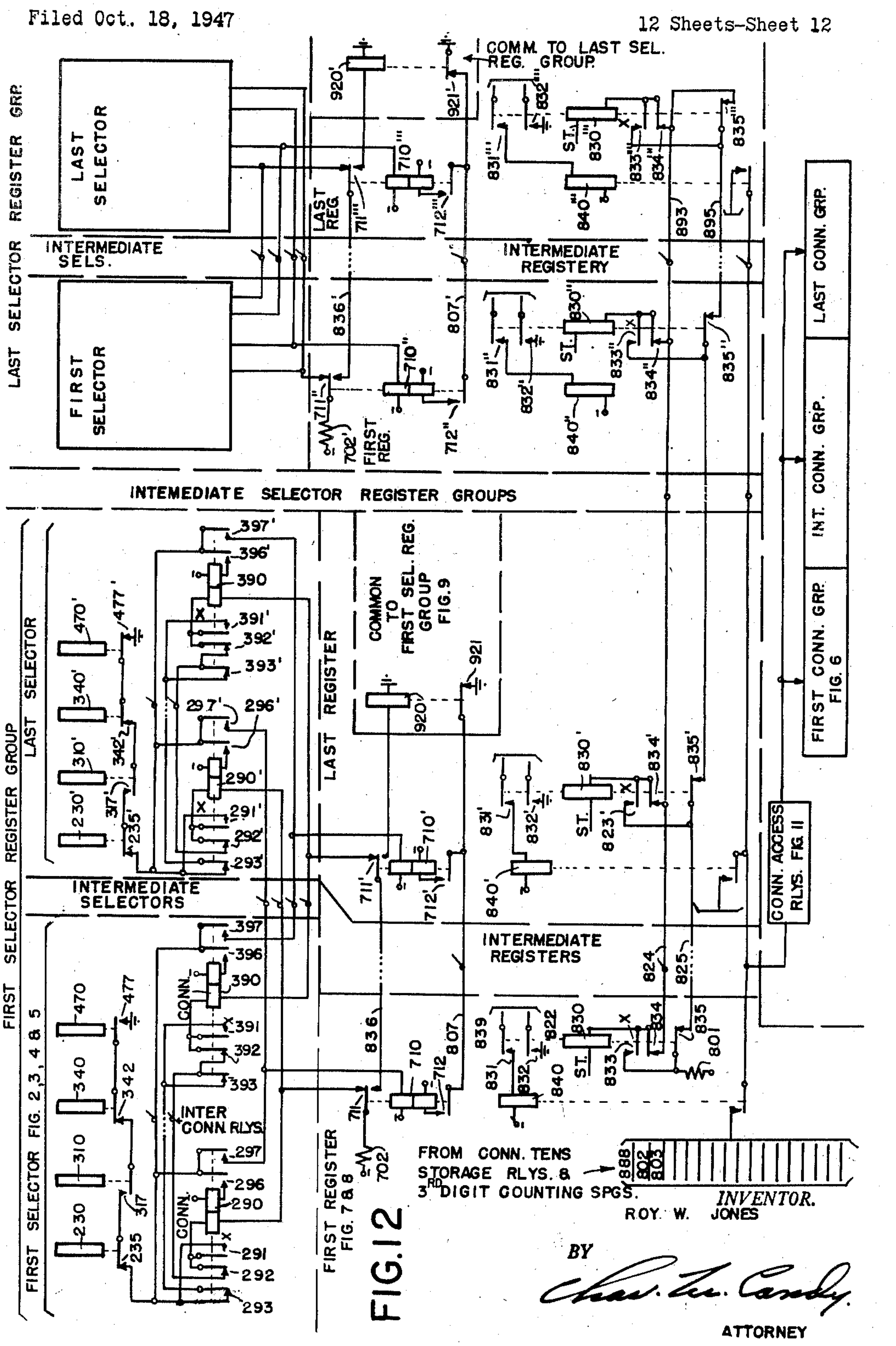

Figure 6 shows the complete connector. Figures 7 and 8 represent a register, it being the first register in the first register group, while Figures 9 and 10 show for simplification of the specification, only the essential parts of other registers, namely the last register in the first register group and the last register in the last register group respectively. Also, Figure 11 shows the connector access relays and Figure 12 presents in somewhat more overall detail than the previously mentioned drawings, the manner in which a plurality of registers are connected to a plurality of selectors and connectors. Figure 13 shows a time chart of the reverting call timer. Figure 14 shows a time chart of the lockout timer.

To describe the equipment shown in the various circuit drawings in greater detail, Figure 1 shows a subscriber's line circuit 100, which is well known in the art connected to a subscriber station "A" and other stations, comprising a "line" relay 110, a "cutoff" relay 130 and a "line lockout" relay 120. This line circuit terminates on a line finder with its associated allotter represented by the rectangle 190 and is accessible over the connector terminals. Immediately below the above mentioned line circuit is shown another circuit which is connected to a trunk through a repeater represented by the rectangle 170 and a line circuit 100', which is similar to the line circuit 100. This also terminates on the linefinder 190, said line circuit being multipled to corresponding terminals of the associated selector tens relays. The linefinder and allotter are described in the co-pending application Serial Number 720,756 filed January 8, 1947, and will be described only briefly herein.

In Figure 2 are shown miscellaneous control relays of the selector including a "trunk identification" relay 210 and a "toll identification" relay 220 both of which are controlled from the linefinder and the finder control unit on calls from an inter-office trunk or from a toll operator, by way of the trunk selecting equipment, not shown, to further prepare the verification circuits. Also shown is a "switching" relay 230, a "reverting call" relay 250 and its associated "time" relay 240, a "reverse battery" relay 260, a "pulsing" relay 270, a "hold" relay 280, and a register "connect" relay 290. Also shown in the middle of the drawing, represented by the rectangle 201, is a reverting call timer with two timing leads extending therefrom, namely, a "time cut-off" lead 205 and a "ring-trip-pulse" lead 206 which are utilized for the timing of the "reverting-call" tone and the release of the finder-selector-connector link after a reverting call has been answered by the called party.

Figure 3 is a continuation of the selector miscellaneous relays, including another "register connect" relay 390, a "hold slave" relay 310 under the control of relay 280, a "transfer" relay 320 which holds on pulsing, a "busy" relay 330, a "pulse transfer" relay 340 to transfer the pulsing circuit for toll monitoring, a "back-bridge" relay 350, a "verification" relay 360, a "toll digit" relay 370 which may be operated by a toll operator upon dialing an extra digit, and a "time lockout" relay 380. A permanent lockout timer is represented at the right hand edge of the drawing by the rectangle 301 with two timing leads extending therefrom, a "time start" lead 307 and a "time release" lead 308 which are utilized for the timing of "permanents" or false seizures.

Figure 4 is a continuation of the miscellaneous relays of the selector including a "code" relay 420 which connects the ringing signals to the line, a "drain" relay 410, under the direct control of relay 420, which shunts the called line after each ringing signal, a "pick-up" relay 430 which operates at the start of each ringing cycle to prepare the ringing circuits, a "ring cut-off" relay 450, a "ring stop" relay 440 under the control of relay 450 or the "back-bridge" relay 350, relay 460 which determines to which side of the line ringing current will be applied, a "cut-thru" relay 470 and "ring set-up" relays 480, 481, 482 and 483. Ringing equipment, which is common to the exchange is shown at the bottom of the drawing by the rectangle 499.

Figure 5:
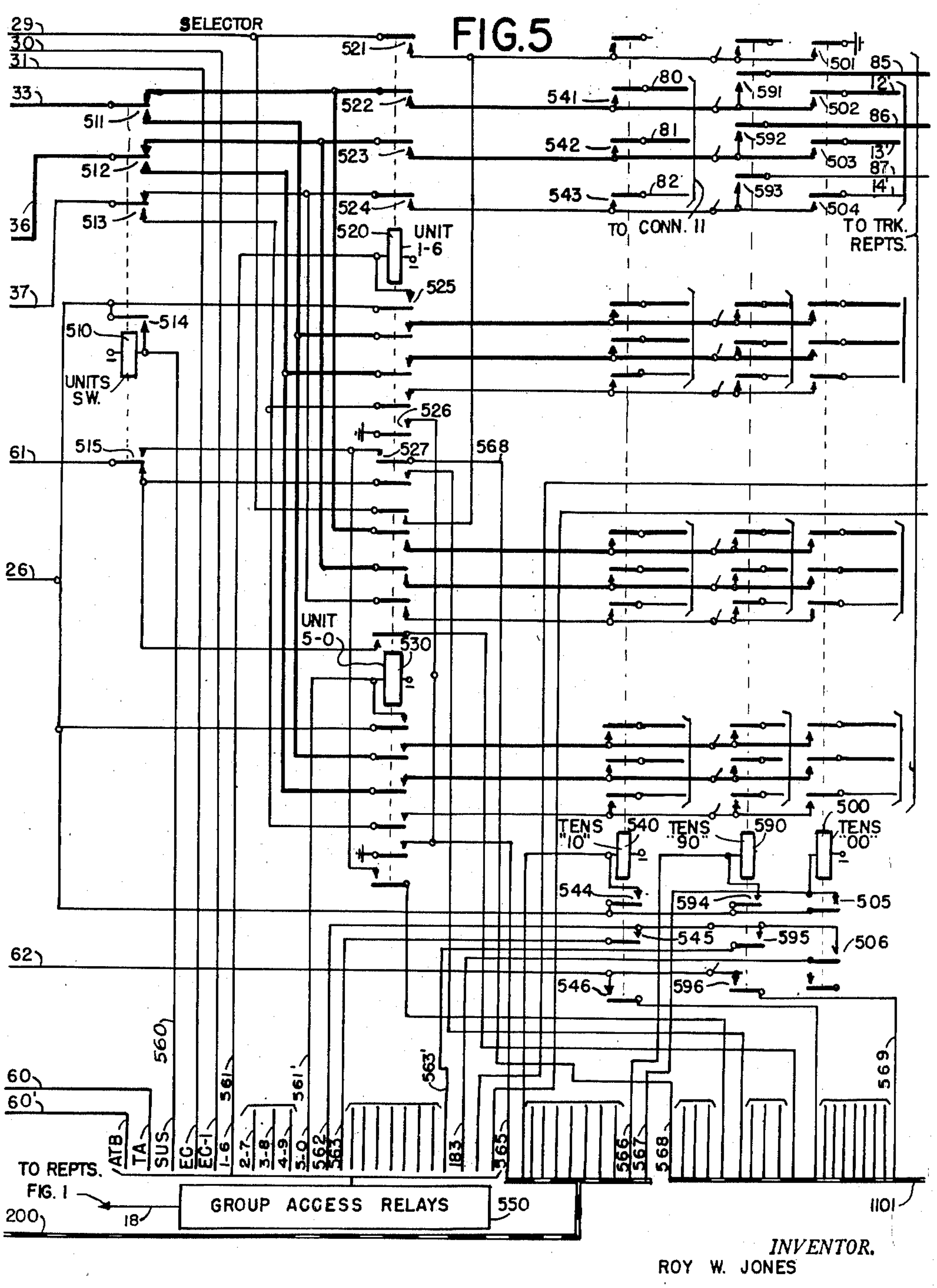

Figure 5 shows a portion of the selector "tens" and "units" relays and includes the "tens" relays 540, 590, and 500, the "units" relays 520 and 530 and a "units switching" relay 510. A selector fully equipped would normally be provided with ten "tens" or group relays each serving ten connectors and/or trunks, and five "units" relays each providing access to two of the contacts of each "tens" relay. The "units switching" relay divides each group of ten lines or trunks into the high-low sub-groups 1 to 5 and 6 to 0, and connects one of the two lines selected by any operated "tens" and "units" relays. If the "units switching" relay remains normal, the connection will be in the 1 to 5 sub-group, while if it is operated, the selection will be in the 6 to 0 sub-group in the selected tens group.

Relay 540 provides access to connectors in the "100" group, one connection being shown by conductors 80, 81 and 82, relay 590 provides access to connectors in the "900" group, one connection being shown by the conductors 85, 86 and 87, these conductors extending to the connector in Figure 6. Relay 500 provides access to trunks of the "000" group, one connection being shown by conductors 12', 13' and 14', which proceed to Figure 1, where they terminate on the trunk line circuit 100'. Relays 540, 590 and 500 each provide access to nine other connectors or trunks in the respective tens groups, of which connections for four are shown and the remaining six omitted in order to simplify the drawing. The seven other tens relays and three of the units relays are omitted for the same reason.

Figure 6 shows one of the connector switches, namely, the connector No. 91 which is accessible from the upper contacts of the selector "tens" relay 590 in Figure 5, the other connectors being, of course, identical except for their points of access and control. In this drawing, relay 610 is for the purpose of busying the connector to the trunk access group and also to supply holding ground to the associated "tens" and "unit" relays, and relay 620 is a "busy test" relay. This drawing also includes a portion of the connector "tens" and "units" relays, relay 630 being the "units" switching relay, relays 640 and 650 being two of the "units" relays and relays 660 and 600 being two of the "tens" relays, it being understood that these relays are similar to the corresponding relays of the selectors and that the "tens" and "units" relays not shown have the same functions and operate similarly under the control of the counting or register relays of Figure 7. This connector provides access to the subscriber lines in the "900" group, and one of the connections to such a subscriber line is indicated by the conductors 93, 94 and 95 shown connected to the contacts of the "tens" relay 600, whence they proceed to Figure 1, where they would terminate on conductors similar to 12, 13 and 14 of line circuit 100 in a line circuit of the 900 group. Relays 600 and 660 also provide access to nine other lines of the same tens group, of which connections for three are shown and the remaining six omitted in order to simplify the drawing. The other "tens" relays and three of the "units" relays are omitted for the same reason.

In Figure 7 are shown the control and counting relays of a register, which is common to the first finder-selector group. This drawing includes relay 710, the "control" relay which is seized by the selector, the "first digit transfer" relay 720, the "register" or "counting release" relay 730, the "second digit transfer" relay 740, the "spill-over hold" relay 750 which prevents tying up of the connector access relays, Figure 11, until after the third digit has been dialed, and the "counting" relays comprising the ten "counting" relays 761 to 760 to the right of the drawing and the three counting control relays 791, 792 and 793 at the left. These relays operate in succession in response to the dial impulses as repeated by the "pulsing" relay 270 of Figure 2, to control the various selecting and ringing functions of the selector and connector. A "counting" relay operates on the first half of each pulse, and on the second half of the pulse, a "counting control" relay operates in series therewith, and releases the previously operated pair of relays. At the end of each digit, the selector or connector performs the switching operation called for by that digit and releases the counting relays by action of relay 730, in preparation for the next digit.

Figure 8, is another portion of the register and includes a "third digit transfer" relay 810, a "busy check" relay 820, a "chain" relay 830 which is connected in a chain with all the registers of the exchange, a "spill-over" relay 840 which connects the register, through the connector access relays (Figure 11) to a designated connector for operating the desired connector "tens" and "units" relays, and four relays 850, 860, 870 and 880 which store the second digit dialed until the "spill-over" relay 840 operates.

Figure 9 shows only the portion essential to this specification of another register, which if shown completely would be similar to that shown in Figures 7 and 8. This register is the last register in the first selector-register group, which includes the "control" relay 910, the "chain" relay 930 and a "spill-over" relay 940. Also shown on this drawing is a "common" relay 920 which is controlled by a chain circuit through all of the "control" relays, namely 710 and 910, of the registers in the first selector-register group.

Figure 10, like Figure 9 shows only the portion of the last register in the last selector-register group essential to this specification. Shown are the "chain" relay 1030 and the "spill-over" relay 1040.

Figure 11 shows the connector access relay group, which is common to all the connectors in the exchange, there being one relay associated with each connector. In this case relay 1190 is associated with connector number 91 shown in Figure 6 and is connected thereto by the leads 88, 89, 90, 91, 92 and 93. Similarly as shown the relays 1110, 1120 and 1100 are associated with connectors number 11, 10 and 90 respectively.

Figure 12, is a schematic layout of the interconnections of the selector-register groups and the common access from all registers to all connectors. This drawing shows a first and last selector and a first and last register, with their common control relay 920, in the first selector-register group. In the case of the automatic telephone system being described, the above group is associated with all the lines in the 100 finder-selector group. Also shown are a first and last selector and a first and last register with their common control relay 920′ associated with all the lines in the 900 finder-selector group. Relays 830, 830′, 830′′ and 830′′′ show the chain connection between all registers in all groups, under control of which the "spill-over" relays 840, 840′, 840′′ and 840′′′ set up the connector "tens" and "units" relays in accordance with the dialed information.

Because of the use of ten-party lines in this system, four-digit call numbers are employed for calls to local subscribers. The first digit selects the hundreds group at the selector, the second digit selects the tens group, in which the wanted line is located, at the connector, the third digit, or unit digit, selects the called line at the connector and the fourth digit selects at the selector the ringing code of the called subscriber on the called line.

Trunk calls use single digit call numbers and do not affect the connectors. In the selector as shown on Figures 2, 3, 4 and 5 a first digit "0" selects a trunk terminating on a repeater and all other first digits select a trunk to a local connector switch. In the latter case the last three digits may be any digit from "1" to "0" and serve to operate the connector "tens" and "units" relays and the selector "ring set-up" relays.

On calls from a subscriber to another subscriber on the same line, known in the art as reverting calls, the four digit directory number of the called subscriber is used.

The general description of the apparatus and the basic method of operation having been completed, a detailed description of the circuit operation will now be given in order to permit complete understanding of the invention. This detailed description is divided into sections to further the understanding of the invention, namely, Subscriber to subscriber call, Busy line condition, Permanent timing, Reverting calls, Trunk calls, which is sub-divided as follows: Subscriber to trunk, Trunk to trunk and Toll to trunk, and Toll operator to subscriber.

*Subscriber to subscriber call*

Let it be assumed that subscriber "A" on the line "105," as shown in Figure 1, wishes to call a subscriber on line "916" having the call number "9164," the last digit representing the fourth ring code.

When a subscriber "A" removes the receiver or hand-set from his telephone instrument to initiate the call, the resulting short circuit of the line causes the immediate operation of "line" relay 110 in the subscriber's line circuit 100 by the way of the line conductors 10 and 11, and break contacts 131 and 132. Relay 110 upon operating, at make contacts 112 connects ground potential to the "CN" or connector test conductor 14 to make the line busy at the corresponding contacts of the connector tens relay and at contacts 111 and 113 connects ground to the marking conductors 31 and 32 leading to the tens and units marking relays (not shown) of the linefinder and allotter 190. The linefinder and allotter operate in the manner described in the copending application Serial No. 720,756 filed January 8, 1947, and will not be described herein except for its application to this invention.

The linefinder upon seizure, places a shunt across the talking conductors 20 and 21 leading to the associated selector, thereby causing the operation of the selector "pulsing" relay 270 and the subsequent seizure of the selector. The operating path of the selector "pulsing" relay 270 is from ground at contacts 394 of "connect" relay 390, conductor 69, similar contacts of the intermediate "connect" relays (not shown) break contacts 294 of "connect" relay 290, the upper winding of pulsing relay 270, break contacts 261, 251, and 231, over the talking conductor 20, into the linefinder 190 through the above mentioned shunt, back over talk conductor 21, back contacts 232, 253, and 262, through the lower winding of "pulsing" relay 270, to negative battery.

Relay 270, upon operating, at make contacts 271 causes the operation of the "hold" relay 280 from ground at break contacts 362. The "hold" relay 280 at make contacts 281 closes a circuit from ground to operate the "hold-slave" relay 310, at make contacts 282 prepares the operate circuit of the "transfer" relay 320 and the impulsing circuit to the associated register.

The "hold slave" relay 310, upon operating, at make contacts 311 extends its operating ground to the test conductor 22, opens the selector guard leads 23 and 24 at break contacts 312, thereby causing the removal of the above mentioned shunt across the line in the linefinder and also causes the allotter associated with the linefinder to step to the next free linefinder in the group, at make contacts 316 places ground on the selector test conductor 37, by way of break contacts 362, conductor 44, break contacts 254 and 233, at make contacts 318 connects ground to the motor start lead 70 which starts the ringing, tone and timing equipment in a manner well known to the art, at make contacts 315 extends ground back into the linefinder over conductor 26 to maintain the locking circuits for the finder "tens" and "units" relays, and closes at make contacts 317 the register seizure circuit, which may be traced as follows: ground at break contacts 477, conductor 79, break contacts 342, make contacts 317, conductor 52, break contacts 235, break contacts 293 of "connect" relay 290 through similar contacts of the intermediate "connect" relays, conductor 68, break contacts 393 of the last "connect" relay 390, conductor 67, through similar contacts of the intermediate "connect" relays, break contacts 292, through the left hand winding of relay 290, conductor 703, break contacts 711 of "control" relay 710 of the first register in the first selector-register group, through the protective resistor 702 to negative battery, thereby operating the "connect" relay 290.

In the foregoing description it has been assumed that all the registers in the selector-register group were idle, therefore, the above mentioned ground from break contacts 477, as traced above to break contact 393 will also be extended through break contacts 392, the left hand winding of the "connect" relay 390, over conductor 39, cable 900, break contacts 911, conductor 836, through similar break contacts of the intermediate "control" relays to the make contacts 711 of "control" relay 710, which are open. Therefore, it will be readily seen that only one "connect" relay of the selector can be operated at a time, thus preventing the occupancy of more than one register switch by an individual selector. This will also hold true for all the intermediate "connect" relays.

The "connect" relay 290, upon energization, will operate its preliminary make contacts 291, indicated on the drawing by "X," before closing or opening any other of its contacts. This closes a maintaining hold circuit from ground at contact 477 so that when break contacts 293 open relay 290 will remain operated; contacts 293 then open the start chain circuit to all the other "connect" relays to prevent them from operating. Relay 290 now opens all its break contacts and closes all its make contacts. Contacts 292 open and further cut the above mentioned chain, and contacts 296 close another holding circuit from the above mentioned ground at contacts 477 to the right hand winding of relay 290 to negative battery. This same ground, hereinafter called "holding ground" is extended through contacts 297, over the hold conductor 837, through the upper winding of relay 710 to negative battery. Relay 710, upon operating, at contacts 711 transfers negative battery through the protective resistor 702 from the left hand winding of "connect" relay 290 to a similar armature spring of the "control" relay of the next register in the group over conductor 836, therefore, preparing it to be seized by the next selector within the selector-register group receiving a call. The above mentioned armature spring of the next register is similar to the spring 911 of the "control" relay 910 in the last register of the group. Also upon the operation of relay 290, the ground at break contacts 294 is removed from the "pulsing" relay 270 at the make-before-break contacts 294 and replaced by ground connected dial tone, which may be traced from conductor 701, which is common to the exchange, through break contacts 723, over conductor 713, to make contacts 294. Dial tone is, therefore, extended back over the calling subscriber's line in the well known manner and the calling party, upon hearing the tone, now dials the first or "hundreds" digit "9" of the call number "9164," thereby causing the selector "pulsing" relay 270 to release and reoperate nine times. Upon the first release of relay 270, the opening of make contacts 271 opens the operating circuit of "hold" relay 280, which having slow-to-release characteristics will not restore during impulsing, while break contacts 271 close a multiple circuit to the "transfer" relay 320 and to the register pulsing circuit. These circuits may be traced as follows: ground from back contacts 382, conductor 47, break contacts 271, make contacts 282, conductor 50, break contacts 341, and divided; first to the right over conductor 51, break contacts 476, conductor 78, through the winding of relay 320 to negative battery and second to the left over conductor 51, through make contacts 295 of "connect" relay 290, conductor 705, contacts 780, 781 and 782 of the "counting control" relays, through the winding of "counting" relay 761 to negative battery. The "transfer" relay 320 operates and having slow-to-release characteristics, will remain operated during dialing, thereby disabling through break contacts 322, the operate circuits of the springs of the "counting" relays of the register and at "break" contacts 321, opens the "time-lockout" circuit. The latter circuit will be covered later in this specification. The "counting" relay 761 operates and at make contacts 771 prepares an operate circuit for the second "counting" relay 762, and at contacts 776 extends its own operating ground to relay 791. Relay 791 also has ground on the other side of its winding from the "holding ground" conductor 837, by way of break contacts 795 and 732, conductor 837, to ground at break contacts 477 as previously traced, and does nothing. On the second half of the pulse, however, when the pulsing circuit is opened, the shunt is removed from relay 791, and this relay operates, in series with relay 761, and at make contacts 782 transfers the pulsing circuit to relay 762. At the start of the second pulse, "counting" relay 762 operates by way of break contacts 780 and 781 and make contacts 782 and 771. Relay 762 in turn, at make contacts 772 prepares the operate circuit of the third "counting" relay 763, and at make contacts 777 extends its own operating circuit to the second "counting control" relay 792 which now has ground on both sides of its winding and, therefore, remains normal. On the second half of the pulse, however, when the operate circuit of relay 762 is opened, relay 792 operates, in series therewith. Relay 792 at make contacts 781 prepares a circuit for the third "counting" relay 763, and at break contacts 795 opens the locking circuits of relay 761 and 791, which restore. At the start of the third pulse, "counting" relay 763 operates by way of break contact 780 and make contacts 781 and 772. Relay 763 in turn, at make contacts 773 prepares the operate circuit of the fourth "counting" relay 764, and at make contacts 778 extends its own circuit to the third "counting control" relay 793 which now has ground on both sides of its winding and therefore remains normal. On the second half of the pulse, however, when the operate circuit of relay 763 is opened, relay 793 operates in series therewith. Relay 793 at make contacts 780 prepares a circuit for the fourth "counting" relay 764 and at break contacts 796 opens the locking circuits of relays 762 and 792 which restore.

The same sequence of operation of the register relays, as described above, will follow with the remaining impulses from the "pulsing" relay 270. In turn register relays 764 and 791 operate on the fourth pulse, relays 765 and 792 on the fifth relays 766 and 793 on the sixth, relays 767 and 791 on the seventh, relays 768 and 792 on the eighth and relays 769 and 793 operate on the last or ninth pulse, the last previously operated pair, of course, releasing at each step.

Shortly after the completion of the ninth and last impulse of the first digit, "transfer" relay 320 restores and at break contacts 322 completes parallel circuits for the operation of the selector "tens" relay 590 and the trunk access relay (not shown) associated with this selector, from ground at make contacts 315, contacts 322, conductor 64 to the left, make contacts 298, "operating ground" conductor 706, and break contacts 725. The circuit for the "tens" relay 590 then passes through make contacts 787 of "counting" relay 769, conductor 708, cable 714, conductor 708, make contacts 216, conductor 566, cable 200, conductor 566 and the winding of relay 590 to negative battery, while the circuit for the trunk access relay passes through make contact 783 of the "counting control" relay 793, conductor 704, make contacts 224, "TA" conductor 60, into the rectangle 550 representing the group access relays, through the trunk access relay (not shown) to negative battery. The operation of the group and trunk access relay is described in the copending application Serial No. 720,756 filed January 8, 1947 and will be described herein only to the extent necessary for this specification.

The "tens" relay 590 upon operating, connects the now open springs of the "units" relays through to the "tens" trunks leading to the "900" group of conductors, at make contacts 594 locks to ground at make contacts 315 by way of the "holding ground" conductor 26 and prepares at make contacts 595 and 596 circuits to the associated trunk group relay in the group access relays 550 and one leg of the connector access relay operating circuit in Figure 11.

The access relay in the group access unit 550 operates and extends all the "units-marking" leads, including 560, 561 and 561′ and miscellaneous control leads 60′, 31 and 30 from the selector to the springs of the trunk group relay associated with this selector and the corresponding trunk group relays also associated with this selector group in the other regular groups of trunk relays. The trunk group relay on operating by way of ground extended from the trunk access relay over conductor 562, make contacts 595 and conductor 563 back to the trunk group relay, extends the "units-marking" leads including 560, 561 and 561′, the "trunk-call-marking" leads 30 and 31 and "all-trunk-busy" lead 60′ through to the trunk selecting relays.

Immediately, upon the extension of the "units marking" leads to the trunk selecting relays, assuming all the connectors in the group are idle, the preselected trunk selecting relay corresponding to the first idle connector in this group, or connector "91," is operated.

The connector "91" is, therefore, the preselected connector ready to receive a call, and ground will be passed back to the selector by the operated trunk selecting relay to operate the 1–6 "units" relay 520 by way of the "units-marking" lead 561, the winding of relay 520 to negative battery. Relay 520 locks to the hold conductor by way of make contacts 525, extends the selector talking and test conductors 33, 36 and 37 to the connector Figure 6, by way of break contacts 511, 512 and 513, make contacts 522, 523 and 524, make contacts 591, 592 and 593 and connector talking and test conductors 85, 86 and 87, and extends ground from make contacts 526, conductor 565, cable 200, conductor 565, contacts 214, conductor 707, break contacts 721, winding relay 730, to negative battery. Relay 730 operates, at break contacts 732 removes "hold ground" from the "counting control" relays, thereby restoring relays 769 and 793 to normal, and at make contacts 733 closes the operating circuit to the "first digit transfer" relay 720 from the "holding ground" conductor 837 through the upper winding of relay 720 to negative battery.

Relay 720, upon operating, closes a holding circuit from "hold ground" conductor 837, through contacts 722, through its lower winding to negative battery, replaces "dial tone" ground 701 feeding the "line" relay 270 with permanent ground at make-before-break contacts 723, opens the operating circuit of "register release" relay 730 at break contacts 721 and prepares another operating circuit for relay 730 at make contacts 721. Relay 720 also at contacts 725 switches the operate ground for the springs of the "counting" relays to the "second digit" or lower group of contacts of the "counting" relays by way of break contacts 754. The opening of contacts 783 by release of relay 793, or the opening of break contacts 725 by operation of relay 720, disconnects grounded conductor 706 from conductor 704 thereby also disconnecting ground from "TA" conductor 60 to release the operated group access relay in 550 to restore and disconnect the previously mentioned units marking and control conductors in 550 from the corresponding conductors in the selector shown in Figure 5.

Relay 730 after restoring to normal, again applies "holding ground" at break contacts 732 to the register "counting control" relays 791, 792, and 793, therefore, preparing the register to receive the second digit of the call number.

As previously mentioned, the operation of the selector "tens" relay 590 and "units" relay 520 has caused the extension of the selector talk and test conductors into the connector number 91 shown in Figure 6. Therefore, relay 610 in the connector will operate by way of ground at break contacts 382, make contacts 316, conductor 44, break contacts 254 and 233, test conductor 37, break contacts 513, make contacts 524 and 593, conductor 87, winding relay 610 to negative battery. Relay 610, upon operating, at make contacts 611 prepares an operating circuit to "busy test" relay 620 and locking circuits to the connector "units switching" relay 630, "units" relays 640 and 650 and "tens" relays 660 and 600, and at break contacts 612 opens the connector guard leads 83 and 84 which action causes the trunk selecting relays in 550 to operate and preselect the next free connector in the group as described in the previously mentioned copending application 720,756.

The foregoing seizure of the connector being easily completed during the interdigital pause, the dialing of the second or the "tens" digit "1" of the call number "9164" now causes the selector "pulsing" relay 270 to release and reoperate once. Upon release of relay 270, "transfer" relay 320 and "counting" relay 761 reoperate over the previously described circuits. Relay 320 opens the operating ground to the "counting" relay contacts at break contacts 322 and "counting" relay 761 extends its operating ground to "counting control" relay 791, but as stated previously, relay 791 is shunted and remains normal. On the second half of the pulse the "pulsing" relay 270 reoperates and removes the operating ground to "counting" relay 761, and relay 791 operates in series therewith.

Shortly after the completion of the one impulse of the second digit "1," "transfer" relay 320 restores, and at break contacts 322 completes a circuit from "operating ground" over conductor 64, make contacts 298, conductor 706, make contacts 725, break contacts 754, make contacts 785 of "counting" relay 761, conductor 890, break contacts 816, winding of "connector storage" relay 850 to negative battery.

Relay 850 operates, extends its operating ground through make contacts 851, conductor 806, winding of "second digit transfer" relay 740, conductor 838, break contacts 814, to the "hold ground" conductor 837, prepares an operating circuit at make contact 853 to the connector "tens" relay 660, and extends ground through its make contacts 852, conductor 808, break contacts 744, through winding of "register release" relay 730, to negative battery. The "second digit transfer" relay 740 will not operate at this time as it is shunted by the operating ground of the "connector storage" relay 850. The "register release" relay 730 operates and at break contacts 732 again removes ground from the "counting control" relay 791 thereby restoring to normal relays 791 and 761. Upon the release of "counting" relay 761 the "operating ground" for "connector storage" relay 850 is removed and relay 740 operates in series therewith. Upon operating, relay 740, at break contact 744 opens the operating circuit of the "register release" relay 730 and closes a shunt across the winding of relay 750 by way of ground at make contacts 743, winding relay 750, break contacts 751 and 741 to "operating ground" conductor 706. "Register release" relay 730 again releases and replaces operating ground at break contacts 732 to the register "counting control" relays, therefore, preparing the register to receive the third digit of the call number.

The third digit "6" of the call number "9164" now causes the "pulsing" relay 270 to release and re-operate six times, thereby sending six pulses to the "counting" relays of the register, in the manner previously described; thus in turn register relays 761 and 791 operate on the first pulse, relays 762 and 792 on the second, relays 763 and 793 on the third, relays 764 and 791 on the fourth, relays 765 and 792 on the fifth and relays 766 and 793 on the last and sixth pulse, the last previously operated pair, of course, releasing at each step.

The "transfer" relay 320 operates on the first pulse of the third digit as before and releases shortly after the last or sixth pulse, however, immediately upon the operation of relay 320, the shunt is removed from the winding of relay 750 by way of "operating ground" on conductor 706 at break contacts 322, allowing relay 750 to operate from ground at make contacts 743, winding relay 750, protective resistor 755 to negative battery. Relay 750, upon operating, opens its shunt circuit at break contacts 751, thereby insuring its remaining operated, prepares at make contacts 752 and 753 respectively operating and circuits to relays 830 and 810, transfers at make contacts 754 the "operating ground" conductor 706, now open at break contacts 322, from the group of "second digit" springs of the register "counting" relays to the "third digit" springs of the register "counting" relays, by way of make contacts 725 and 754 and break contacts 812.

Shortly after the last or "sixth" impulse "transfer" relay 320 again restores, and at break contacts 322 returns "operating ground" to conductor 706, which over parallel paths prepares the operating circuit for the connector "units" relay 640 and completes the operating circuit for the register "chain" relay 830.

As mentioned previously, one of the features of this invention is the common access from any register into all of the connectors, therefore, means are available to prevent double connection of connectors, by way of a relay chain circuit interconnected to all registers in the exchange. This chain is the negative battery feed for all the "chain" relays 830, 930, 1030 and intermediate "chain" relays, not shown on the drawings and is arranged such that only one "chain" relay may be operated at a time. This chain circuit, which is well known in the art, is fed from negative battery through protective resistor 801, break contacts 835 of "chain" relay 830, which is in the first register of the first selector-register group, conductor 825, through similar contacts of the "chain" relays in the intermediate register of the same group, through break contacts 935 of the "chain" relay 930 which is in the last register in the first selector-register group, conductor 895, through similar contacts of the "chain" relays in the intermediate selector-register groups, break contacts 1035 of the "chain" relay 1030 which is the last register in the last selector-register group, conductors 893, and 824, break contacts 834, winding relay 830, "start" conductor 805, break contacts 816, conductor 756, make contacts 752, break contacts 731, to "operating ground" at break contacts 322 previously mentioned.

In the foregoing description it has been assumed that no other "chain" relay was operated and that there was no "call" from any other register for the operation of their "chain" relay, in other words there was no "operating ground" applied to their "ST" leads with the exception of "chain" relay 830.

"Chain" relay 830 upon operating, closes a holding circuit through its preliminary make ("X") contacts 833 from negative battery through the protective resistor 801, opens its operating circuit and the operating circuit to all other "chain" relays in other registers at break contacts 835, and 834, also at make contacts 831 and 832 it closes the operating circuit to the "spill-over" relay 840, by way of ground at make contacts 832, conductor 822, make contacts 218, conductor 61, break contact 515, make contact 527, conductor 568, cable 1101, conductor 568, winding "connector access" relay 1190, conductor 569, cable 1101, conductor 569, make contact 569, conductor 62, make contact 219, conductor 839, make contacts 831, winding relay 840, to negative battery. Relays 840 and 1190, the latter being individual to connector "91," operate in series and close the operating circuits to the connector "tens" and "units" relays.

Now the register is prepared to "spill-over" into the connector the "second" and "third" digits dialed, "1" and "6" respectively. As previously described the "second" digit "1" was stored in the register by the operation of the "connector storage relay" 850; therefore, "hold ground" from conductor 837, through break contacts 881, 871, and 861, make contacts 853, and 844, conductor 953, make contact 1195, conductor 92, winding "tens" relay 660, to negative battery, operates relay 660 which corresponds to the line in the "10" group which was dialed, and in the same manner the "units" relay 640 corresponding to the "third" digit, "6," just dialed, is operated, by way of ground from the "operating ground" conductor 706, make contacts 725 and 754, break contacts 812, conductor 804, make contacts 718, conductor 803, make contacts 843, conductor 952, make contacts 1193, conductor 88, winding "units" relay 640 to negative battery. At the same time "operating ground" on conductor 804, as traced above, through make contact 719, conductor 802, make contact 842, conductor 951, make contact 1192, conductor 89, winding relay 630, to negative battery, operates the "units switching" relay 630.

The "tens," "units" and "units switching," relays 660, 640 and 630, on operating, close holding circuits through make contacts 665, 645 and 634, respectively, to the "connector hold" ground at make contact 611, extend the "talk" conductors 85, and 86 from the selector through the called line, description of which will follow later in this specification, and at make contact 664, ground is extended through make contact 641, conductor 91, make contact 1191, conductor 950, make contact 841, conductor 888, break contact 811, conductor 896, make contact 721, winding relay 730, to negative battery thereby operating the "register release" relay 730 again. Relay 730 removes "holding ground" at break contacts 732 from the register "counting control" relay 793, thereby releasing relays 793 and 766, as previously described, opens the operating circuit at break contacts 731 to the "chain" relay 830, closes the operating circuit for the "third digit transfer" relay 810, by way of ground at make contacts 734, and 753, conductor 887, upper winding relay 810, to negative battery.

Upon releasing the "chain" relay 830, at its contacts 833, 834 and 835 restores the chain circuit of all registers to a normal condition, thereby freeing the connector "spill-over" link for use by any of the other registers which may require it, and opens the circuit to and thereby restores the "spill-over" relay 840 and the "connector access" relay 1190 at contacts 831 and 832. It will be obvious from the foregoing that the connector "spill-over" link through the connector access relays of Figure 11 is held for only a very short interval, just long enough to operate the connector "tens" and "units" relays associated with the dialed number. The "third digit transfer" relay 810 upon operating, closes at make contacts 813 a holding circuit from "holding ground" conductor 837, to its lower winding, opens the holding circuit for relays 740 and 850 at break contacts 814, at break contacts 818 further opens the operating path to the "chain" relay 830, at break contact 815 opens the operating circuit to the slow-to-release "busy check" relay 820, which has been operated since the seizure of the register by the selector, transfers at contacts 816, 817, 819 and 819' the conductors 890, 891, 892 and 893 from the connector "tens storage" relays 850, 860, 870 and 880, to conductors 866, 867, 868 and 869, the latter being the operating paths for the selector "ring storage" relays 480, 481, 482 and 483. At contacts 811 relay 810 opens the circuit to the register relay 730 which restores.

Relays 740, 850 and 730 restore, and in turn relay 750 restores, its operating circuit being opened at make contacts 743 and transfers at contacts 754 the "operating ground" conductor 706 from the "third digit" group of springs of the register relays back to the "second and fourth digit" group of springs, by way of make contacts 725 and break contacts 754. Relay 730 upon restoring, again connects "holding ground" from conductor 837 to the register "counting control" relays, thereby preparing the register to receive the "fourth" or last digit of the call number.

The "fourth" or last digit "4" of the call number "9164" now causes the "pulsing" relay 270 to release and reoperate four times, thereby sending four pulses to the "counting" relays of the register, and in the manner previously described, relays 761 and 791 operate on the first pulse, relays 762 and 792 on the second pulse, relays 763 and 793 on the third pulse and relays 764 and 791 on the fourth and last pulse, the last previously operated pair releasing, of course, at each step. The "transfer" relay 320 again operates on the first pulse of the "fourth" and last digit as before, and releases shortly after the last or "fourth" pulse, therefore, ground at make contacts 315 now operates the dialed "4" "ring storage" relay 483 by way of break contacts 322, conductor 64 to the left, make contacts 298, conductor 706, make contacts 725, break contacts 754, make contacts 786, conductor 892, make contacts 817, conductor 869, make contacts 223, conductor 59, left-hand winding relay 483 to negative battery. The "ring storage" relay 483 closes a holding circuit, by way of ground at make contacts 315, to the right on conductor 26, break contacts 443, make contact 493, right hand winding relay 483, to negative battery. Other functions of relay 483 will be covered later in this specification.

As mentioned previously, the operation of the "tens," "units" and "units switching" relays, 660, 640 and 630 extends the talk conductors 85 and 86 from the selector to the called line conductors 55 and 56, Figure 6, and the test conductor 97 to line conductor 57, by way of make contacts 631, 632 and 633; 642, 643, and 644; and 661, 662 and 663. The above mentioned conductors, 55, 56 and 57 are connected to the called subscriber's line circuit which is the same as the line circuit 100 in Figure 1 except it is associated with line "916" instead of line "105" as shown. Therefore, assuming for this description that the line circuit 100 is connected to line "916" at conductors 11 and 12 and that subscriber station A is the assigned "fourth" code, therefore its calling number is "9164," the connector line and test terminals 55, 56 and 57 will be connected to the line circuit 100 leads 12, 13 and 14 respectively. It is also assumed at this time that the called line is not being used, and that it is free to receive the call which has been described in the foregoing explanation. Busy condition of the called line will be described later in this specification.

Upon extension of the line and test conductors to the called subscriber's line circuit the "busy test" relay 620 will operate from ground at make contacts 611, upper winding relay 620, conductor 97, make contacts 633, 644, and 663, conductor 57, conductor 14, break contact 112, winding of relays 130 and 120, to negative battery. Relays 620, 130 and 120 operate in series. Relay 130 upon operation, at break contacts 131 and 132 disconnects the subscriber's "line" relay from the line conductors 10 and 11, and relay 120 upon operating, prepares a holding circuit for itself at make contacts 121 and at break contacts 121 and 122 disconnects from the finder marking leads 31 and 32. The subscriber's line circuit is now in condition for ringing and talking.

Relay 620 upon operating closes a holding circuit from ground at make springs 611, and 623, lower winding relay 620 to negative battery, places solid ground at make contacts 622 on the test conductor, 97, shunting out its upper winding, removes negative battery through protective resistor 99 from talk conductor 85 at break contacts 621, shunts condenser 98 at make contacts 621, the subscriber's line being now ready for ringing, and further opens the connector "guard" circuit at break contacts 624. The above operation takes place before or during the dialing of the "ring" or fourth digit, being dependent upon how soon the subscriber dials. However, on a free or non-busy line, relay 620 will operate and remove the negative battery, through the protective resistor 99, from talk conductor 85 before the aforementioned slow-to-release "busy-check" relay 820 in the register, Figure 8, restores. Upon restoring, relay 820 connects ground at break contact 821 over conductor 826, make contact 299, conductor 63, upper winding "busy" relay 330, conductor 58, break contact 471, conductor 33, break contact 511, make contacts 522 and 591, conductor 85 to contact 621, where at this point an open circuit is encountered due to the removal of the negative battery at break contacts 621 and thus the "busy" relay 330 will not operate. Also, if further traced out over conductor 96, to the called line circuit 100, subscriber's line 10, it will be seen that there is no circuit path, since cut-off relay 130 is operated.

The "ring storage" relay 483 has operated and in addition to the aforementioned functions, connects at make contact 485 holding ground from make contact 315, break contact 322, conductor 64 to the right, make contacts 485, conductor 77, break contact 332, conductor 73, break contact 473, winding "cut-thru" relay 470 to negative battery, at make contact 484 connects ground to relay 460 by way of break contacts 486, 487 and 488, and at make contacts 489 prepares a path for the ring code "R4" from the ringing equipment 499.

The "cut-through" relay 470 operates, closes a holding circuit to "holding ground" at make-before-break contact 473 and opens its operating circuit, at make contacts 471 and 472 further prepares the talk conductors for ringing and talking, at break contacts 476 opens the previously traced operating circuit to the "transfer" relay 320, at make contacts 475 prepares the operating circuit of the "pick-up" relay 430, closes the start circuit to the "interrupter start" lead 496, by way of ground at make contact 478, break contact 444, conductor 496, to the "ringing equipment" 499 and at break contacts 477 opens the previously traced holding circuit to the selector "connect" relay 290 and the register relays.

The selector "connect" relay 290 restores, opening at its make contacts the connections between the register and selector, at make-before-break contacts 294 replaces ground for the selector "pulsing" relay 270 from the register lead 713 back to ground at break contact 304, as previously described and prepares its chain start circuit for further operation.

Removal of "holding ground" from conductor 837 at break contacts 477 as mentioned above, restores relays 720, 764 and 791 of Figure 7 and relay 810 of Figure 8. All relays in the register are now at normal with the exception of the "control" relay 710, which is held operated by its lower winding from ground at break contact 921. This ground will be removed by the operation of the common control relay 920, only after all the registers in the group have been used, thereby allowing rotation of all registers. It will be noted as previously mentioned, that the "control" relay 710 at make contact 711 has forwarded negative battery through the protective resistor 702 to the next idle register, thus the start or seizure circuit for the above used register remains open.

Relay 460 operates and at make contacts 461 and 462 conditions the line for ringing to ground on the negative talk conductor 10. The ringing interrupter now starts, if not already in operation caused by another call. This interrupter, the general type of which is immaterial as far as this invention is concerned, proceeds therefore to connect ground pulses representative of the different ringing codes to the ten ringing conductors R1 to R10. All of these ringing conductors except R4, however, are now open at the springs of the "ring storage" relays. Furthermore, conductor R4 is open at the springs of the "pickup" relay 430. At the start of each ringing cycle, the interrupter connects negative battery momentarily to the "PU" conductor 498 to mark the start of the ten codes. The battery pulse on conductor 498 causes the "pickup" relay 430 to operate, by way of battery on the "PU" conductor, make contacts 475, and break contact 431. Relay 430 thereupon at contacts 431 transfers from its operating circuit and locks to the hold battery ("HB") conductor 497, which has steady battery connected to it at the start of each cycle and removed at the end of each cycle of the ringing interrupter, and at make contacts 432 extends the "R4" ringing lead to the "code" relay 420. The "code" relay 420 now follows the ground pulses on the coding conductor "R4," by way of make contacts 489, break contacts 490, 491 and 492, make contacts 432, winding relay 420, to negative battery and operates and releases in accordance with the code. At each operation, break contacts 421, and 422 "split the trunk," or disconnect the calling line from the called line, while make contacts 421 and 422 connect the ringing current momentarily to the called line. This circuit is from battery through the ringing generator, not shown, on conductor 402 in the middle of Figure 4, through the winding of "ring cut-off" relay 450, make contacts 462, 422 and 472, conductor 36, break contact 512, make contacts 523 and 592, conductor 86, make contacts 632, 643 and 662, line conductor 56, one-half of the ringers of the called line in parallel, to ground at the subscriber's station. The "ring cut-off" relay 450, in a manner well known to the art, will not operate on ringing current due to its slow-to-operate characteristics. The "code" relay 420 also, at make contact 423, causes the "drain" relay 410 to operate and release in unison. Relay 410 is made slow-to-release, however, and during the short time interval between the release of the two relays, "drain" relay 410 at make contacts 411 and 412 shorts the called line momentarily with ground and battery through the resistance 401, thereby draining the ringing voltage from the called line.

The called party, upon hearing his telephone ringer repeat his code, answers by removing the receiver or handset in the usual manner, to close the called line loop. Assuming that the called party's answer occurs while ringing current is actually on the line, "ring-cut-off" relay 450 operates. The removal of the receiver or handset at the called station completes a direct current circuit through the hook springs of the telephone, in the well known manner from negative battery through the ringing generator on conductor 402 out over the called line, as previously traced, back over line conductor 55, make contacts 661, 642, 631, and 621 conductor 85, make contacts 591 and 522, break contact 511, conductor 33, make contacts 471, 421 and 461, to ground. "Ring-cut-off" relay 450 operating over this circuit, closes ground at make contact 451 to complete the operating circuit of the "ring stop" relay 440. The "ring stop" relay 440 upon operating, locks to "holding ground" conductor 26 at make contact 442, opens the interrupter start circuit, conductor 496, at break contact 444, thereby stopping the ringing equipment 499 if not held operated by another selector within the exchange, opens the circuit to the "time lockout" relay 380 at break contact 441, thus preventing any operation of the "permanent lockout" circuit, and at break contacts 443 opens the holding circuit to the "ring storage" relay 483. Relay 483 restores, at contacts 484 opens the operating circuit to relay 460, at contact 489 opens the operating circuit to "code" relay 420 and at contact 485 further opens the operating circuit to "cut-thru" relay 470. Relays 460 and 420 restore and in turn relay 410 restores. The called line loop is now connected to the "back-bridge" relay 350 which operates by way of ground, upper winding relay 350, break contact 361, conductor 32, break contact 411 and 421, make contact 471, conductor 33, break contact 511, make contacts 522 and 591, conductor 85, make contacts 621, 631, 642 and 661, line conductor 55, called subscriber's station, line conductor 56, make contacts 662, 643 and 632, conductor 86, make contacts 592 and 523, break contact 512, conductor 36, make contact 472, break contacts 422 and 412, conductor 35, break contact 362, lower winding relay 350, to negative battery.

If, however, the called party answered during a silent period or when ringing current was not on the called line (relays 420 and 410 restored) the "back-bridge" relay 350 will operate over the path described above. Thus the "back-bridge" relay 350, upon operating, at make contact 351, closes from ground, over conductor 74, an operating circuit to "ring-stop" relay 440, which operates and stops ringing as described above. The "back-bridge" relay 350, operated either before or after the "ring-stop" relay 440, as mentioned above, at make contacts 353 closes the operating circuit to the "reverse battery" relay 260, by way of hold ground at contact 315, to the left on conductor 26, break contact 255, conductor 45, make contact 353, conductor 46, lower winding relay 260, to negative battery. Contacts 352 on the "back-bridge" relay 350 need not be considered at this time as their operation is concerned with reverting calls which will be covered later in this specification.

The "reverse-battery" relay 260, upon operating reverses the battery feed to the calling line in the well known manner at make-before-break contacts 261 and 262. Contacts 263 and 264 are used in conjunction with reverting call and will be covered later. The talking circuit between the calling and called stations is now complete, with "pulsing" relay 270 supplying talking battery to the calling line, and "back-bridge" relay 350 to the called line. The complete connection is from station "A" in Figure 1, over the line conductors 10 and 11, through the "tens" and "units" relays, not shown, in the finder 190, conductors 20 and 21, break contacts 231 and 232 and 251 and 253, talking condensers 202 and 203, conductors 32 and 35, break contacts 411 and 412, and 421 and 422, make contacts 471 and 472, conductors 33 and 36, break contacts 511 and 512, make contacts 522 and 523, and 591 and 592, conductors 85 and 86, make contacts 631 and 632, 642 and 643, and 661 and 662, line conductors 55 and 56, to the called station.

If the called party hangs up first, "back-bridge" relay 350 restores and releases the "reverse-battery" relay 260, "ring-stop" relay 440, and relay 240, but nothing else happens. When the calling party hangs up, however, the selector "pulsing" relay 270 restores and opens the operating circuit to the "hold" relay 280 at contacts 271. Relay 280 restores after a short delay and at contact 281 opens the operating circuit to "hold slave" relay 310 and also removes ground from the calling line test conductor 22. Relay 310 on restoring, removes ground at contact 315 from the "hold" lead 26, at contact 316 opens the operating circuit to relay 610 in the connector, at contact 312 recloses the "guard" leads 23 and 24 making the finder-selector link free for another call upon release of the finder, contact 317 further opens the start circuit to the selector "connect" relays 290 and 390 and contact 318 opens the "motor-start" circuit thereby stopping the tone and ringing equipment, if not held by another selector.

Removal of ground from the "hold" conductor 26 causes the release of the finder and in the selector restores relays 440, 470, 520 and 590. The restoring of relay 610 in the connector causes the release of the "busy-test" relay 620, "tens" relay 660, "units" relay 640 and "units switching" relay 630.

Ground removed from the test conductor 30 of the calling line restores relays 130 and 120 in the line circuit 100 and similarly ground removed from the test conductor 57 of the called line restores similar relays in the called line circuit. Now both calling and called line circuits, finder, selector and connector switches are at normal and ready for reuse.

If the calling party hangs up first, release of the calling party's line circuit 100, and the selector and connector switches is effected as above; however, assuming now that line circuit 100 is associated with the called line, removal of ground from conductor 14 by release of the connector opens the operating circuit to relays 130 and 120. Relay 130 restores, but, relay 120 being slow-to-release remains operated for a short time and during this period the called line loop is connected to the "line" relay 110 through break contacts 131 and 132. Relay 110 thereupon operates, closes a holding circuit from ground at make contacts 111 to relay 120 through make contact 121 and at make contact 112 places ground on the test conductor 14 thereby making that line busy to calls. When the called party hangs up relay 110 restores and shortly thereafter relay 120 restores making the line free for further use.

*Busy line condition*

Should the called line, just described above, be busy the connector test conductor 57 will encounter ground from the called lines test conductor. This will occur after the third digit and the extension of the calling line's talk and test conductors to the called line. Ground on the test conductor 57 will be passed back through the springs of the connector "tens" relay 660, "units" relay 640, "units" switching relay 630, and conductor 97 to the "busy test" relay 620 thereby shunting its operate or upper winding, ground being applied on the other side at make contact 611.

As previously, mentioned, shortly after the operation of the "third digit" transfer relay 810, Figure 8, the "busy check" relay 820 will restore and apply ground to the upper winding of the "busy" relay 330, Figure 3, which is now connected to negative battery through the protective resistor 99 at break contacts 621 due to the non-operation of the "busy-test" relay 620. This circuit may be traced from ground at break contacts 821, conductor 826, make contact 299, conductor 63, upper winding "busy" relay 330, conductor 58, break contact 471, conductor 33, break contact 511, make contacts 522 and 591, conductor 85, break contact 621 to negative battery through protective resistor 99.

The "busy" relay, upon operating, at make contact 333 closes a locking circuit to ground at make contacts 314, at make contact 331 applies "busy" tone from conductor 302 through by-pass condenser 303 to the "+" line, at break contact 332 opens the circuit to the "cut-thru" relay 470, thereby preventing it from operating and closing the calling line to the busy called line, prepares the operating circuit for relay 340 at make contact 332 and at make contacts 334, 335, 336 and 337 prepares circuits for toll monitoring and reverting call, which will be covered later in this specification. As previously described, upon the release of the "transfer" relay 320 after the fourth or "ring" digit, the "ring storage" relay 483 operates and at its make contact 485, closes the operating circuit to relay 340. This circuit may be traced from ground at make contact 315, break contact 322, to the right on conductor 64, make contact 485, conductor 77, make contact 332, winding relay 340, to negative battery. Relay 340 operates and at break contact 342 opens the "holding ground" circuit, previously traced, for the selector "connect" relay 290 and the relays in the register. Therefore, upon the release of relay 290 and the register relays, the register is available for other calls, dependent upon the common relay 920, Figure 9, as described previously.

The calling subscriber upon receiving "busy-tone" indicating that the called line is in use, hangs up, thereby releasing the link, and freeing it for other calls. The original path of "busy-tone" may be traced by way of ground, through "busy-tone" generator, not shown, conductor 302, make contact 331, by pass condenser 303, break contact 362, to the left on conductor 35, talk condenser 203, break contacts 253 and 232, conductor 21, through the finder 190, "—" line conductor 11, through the calling subscriber's station "A," back over "+" line conductor 10, through finder 190, conductor 20, break contacts 231, 251, and 261, upper winding "line" relay 210, make contact 294, conductor 713, to ground at make contact 723. Upon release of connect relay 290 however, contacts 294 thereof disconnect conductor 713 from this circuit and substitute grounded conductor 69.

*"Permanent" timing*

In the case of "permanents" or shorted lines, which cause seizure of the finder-selector link but are not followed by dialing, or partly completed calls, where for some reason sufficient digits are not dialed, or too long a time elapses between digits, or when the called party does not answer the ringing signal after sufficient time has elapsed and the calling party has not released the finder-selector link, a timer will force release of the switches involved and lock out and make busy the offending line. Conversation timing can also be provided but is not shown in this specification. The timer, which is common to the exchange and is started by the grounding of the motor start lead 70, as previously described, is represented by the rectangle 301 in the right center of Figure 3. It will be noted that two timing conductors extend from the timer 301, namely the "TR" or "timing-release" conductor 308 and the "TS" or "timing-start" conductor 307. Upon the starting of the timer, the "TR" lead 308 normally has ground on it, which is removed momentarily every two minutes during operation of the timer and the "TS" lead 307 has ground placed on it momentarily every two minutes by the timer, shortly after the ground is replaced on the "TR" lead. Figure 14 is a schematic chart which shows the opening and closing of the "TR" and "TS" leads which should further explain the above actions.

When a finder-selector link is seized by a call, or by a shorted line, or any similar cause, the selector "pulsing" relay 270 thereupon operates and seizes a register as previously explained. Relay 270 thereupon causes operation of the "hold" relay 280 and "hold-slave" relay 310 which locks the link. The "hold-slave" relay 310, starts the timer at make contact 318, prepares the pulsing and timing circuits, and the register seizure circuit, as previously described. The "time lockout" relay 380 is now connected to the timer 301 by way of break contacts 363 and 321, make contact 313, conductor 76, break contact 441, conductor 75, break contact 381, and the "TS" lead 307. The "TR" lead 308 is open at make contact 382.

If dialing does not occur before the ground pulse appears on "TS" lead 307, which may happen any time within two minutes of seizure, depending upon the starting position of the timer, "time-lockout" relay 380 will be operated by said pulse. Relay 380 at make-before-break contact 381 will lock operated to ground, opening its operating circuit, and at make-before-break contact 382, will transfer, from permanent ground to ground on "TR" lead 308, the holding circuit for "hold" relay 280 and the holding circuit for relay 610 in the connector. If dialing still does not occur, the timer, after two minutes will remove ground from the "TR" lead 308, thereby releasing relays 280 and 610 and the link. The "cut-off" relay 130 of the faulty line restores, and the "line" relay 110 reoperates, to lock up the slow-to-release "lockout" relay 120 and thereby lockout said line from any further seizure until the trouble is remedied and the short removed from the line.

Similarly if the called line is busy and the calling party does not hang up within the two minute period or if the line is not busy and ringing has started, but the called party does not answer and the calling party does not hang up with the two minute period, the link will be released and the calling line set in lockout condition until the calling party hangs up.

Since a ground pulse appears on "TS" lead 307 every two minutes, while the timer is operating, it is possible that the "time-lockout" relay 380 may operate at any time between seizure of the link and completion of the connection. If dialing follows seizure, however, in the normal way, each digit causes the "transfer" relay 320 to operate and opens its break contact 321, so that if the "time-lockout" relay 380 had operated, it will thereupon release and start a new timing cycle.

If, however, the call has gone through in the normal way and the called party answers, "ring-stop" relay 440 operates, as previously described, and opens its break contact 441, so that if the "time-lockout" relay 380 had operated, it will thereupon release. Also the timing circuit will be disabled at break contact 363, when a busy line is being monitored by a toll operator, which latter condition will be covered later in the specification.

*Reverting calls*

In the case of a reverting call, where a subscriber on a party line wishes to call another subscriber on the same line, the calling party will dial the regular four digit directory number of the wanted party in the regular manner and upon receiving busy tone will then hang up to permit ringing of the called party to start, and after a reasonable interval, will come back in on the line.

Let it be assumed, for example, that the line 105 in Figure 1 is a party line and that one subscriber on this line has called another subscriber whose call number is "1057" where "105" is the line number and "7" is the ringing code number. Upon completion of dialing the call number "1057," in the same manner as previously described, the following relays of the link are operated; in the line circuit 100, "cut-off" relay 130 and "lockout" relay 120; in the selector, "pulsing" relay 270, "hold" relay 280, "hold-slave" relay 310, "connect" relay 290, "tens" relay 540, "units" relay 520, and "ring storage" relays 480 and 483; in the connector, relays corresponding to "tens" relay 600, "units" relay 650 and relay 610; and in the register; "control" relay 710, "first digit transfer" relay 720, "counting" relay 767, "counting control" relay 791 and "third digit" transfer relay 810.

As the line number of the calling and called line is in the "100" group, a connector associated with that group has been selected by the selector "tens" and the group access relays 550. In this case, it is assumed that the group access relays 550 have allotted connector number 11 to the selector. For the purpose of this explanation it will be assumed that the selector talking and test conductors 80, 81, and 82 will be connected to the connector incoming talking and test conductors 85, 86 and 87 respectively. Also, it follows that the connector "tens" and "units" relays have been operated, by the "spill-over" circuits, at contacts of the "spill-over" relay 840, through the "connector access" relay 1110, instead of by relay 1190 as shown on the drawings.

As the calling subscriber has dialed his own line number "105," the connector test conductor 95 encounters ground from the line circuit 100, Figure 1, by way of conductor 14, break contact 112, conductor 30, through the finder, conductor 22, make contacts 311 and 281. This ground therefore, shunts the connector "busy test" relay 620, preventing its operation, by way of conductor 95, make contacts 605 and 655, break contact 633, conductor 97 to the upper winding of relay 620 and ground at contact 611. Thus as described previously, after the third digit has been dialed and the "third digit transfer" relay 810 has operated in the register, thereby opening the circuit to the "busy check" relay 820, which restores shortly thereafter. Ground at break contact 821 completes the operating circuit to the "busy" relay 330 of the selector to negative battery on the "+" talk conductor 85 through the protective registor 99 at break contacts 621.

The "busy" relay 330, upon operating, at make contacts 331 places busy tone on the calling line, at make contact 334 prepares the operating circuit to the "reverting call" relay 250, at make contact 337 closes the circuit to its lower winding and at make contact 332 prepares the operate circuit to relay 340. After the completion of the "ring" or fourth digit "7" and the "transfer" relay 320 restores, the "ring storage" relays 480 and 483 operate from relay 767 and closes the operating circuit to relay 340 by way of "operating ground" on conductor 64, make contact 485 and 494 in parallel, conductor 77, make contact 332, winding relay 340 to negative battery. Relay 340 upon operating at break contact 342 releases the register for other calls.

The calling subscriber, now hearing "busy-tone," hangs up his receiver, the selector "pulsing" relay 270 immediately restores, and at make contact 271 opens the operating circuit to "hold" relay 280 which shortly restores. Upon restoring, relay 280, at make contact 281 removes its ground from the test conductor 22 and the "hold" slave relay 310 and at break contact 281 closes the operating circuit to "reverting call" relay 250. A locking circuit for the "hold-slave" relay 310 has been established, due to the fact that the calling and called stations are on the same line. This locking circuit may be traced as follows: ground through make contacts 611, Figure 6, upper winding "busy-test" relay 620, conductor 97, break contact 633, make contacts 655 and 605, line test conductor 95, conductor 14, Figure 1, break contact 112, conductor 30, through the finder, conductor 22, make contact 311, winding relay 310, to negative battery. This ground also maintains the "cut-off" relay 130 and "lockout" relay 120 operated and is also extended at contact 311, over conductor 38, break contact 281, conductor 41, make contact 334, conductor 43, break contact 213, upper winding "reverting call" relay 250, to negative battery. The "busy-test" relay 620 now operates from negative battery through the windings of relays 120 and 130 in series, relay 310 and relay 250, all in multiple. Upon operating, relay 620, at make contact 623 closes the circuit to its lower or holding winding, at break contact 624 further opens the connector guard leads, at make contact 622 places direct ground on the test conductor, at break contact 621 opens the operating circuit to the "busy" relay 330, and at make contact 621, prepares the "+" line conductor for ringing. The "reverting call" relay 250 upon operating, at make contact 257 closes a circuit for its lower winding over conductor 47 to ground at break contact 382, at make contact 256 prepares a holding circuit to relay 260, at break contact 259 opens the holding circuit to the "busy" relay 330, at make contact 258 prepares a holding circuit to the "reverse-battery" relay 260, at break contacts 251 and 253 opens the talking conductors, at make contact 252 prepares the "reverting call tone" path, and at make-before-break contact 254 transfers the operating circuit for relay 610 from ground at break contact 382 through make contact 316, and conductor 44 to ground at break contact 263. The "busy" relay 330 now restores, at contact 331 removes "busy tone" from the line, at contact 334 opens the operating circuit to relay 250, clears its own locking circuit at contact 337, and at contacts 332 opens the circuit to relay 340 and closes the operating circuit to the "cut-thru" relay 470. Relay 340 restores and at contact 342 recloses the register seizure circuit, however, this circuit is immediately re-opened by relay 470, description of which follows. The "cut-thru" relay 470 now operates by way of "operating ground" on conductor 64, make contacts 485 and 494 in multiple, and conductor 77, break contact 332, conductor 73, to negative battery through the relay winding.

Relay 470 upon operating, at break contact 477 further opens the seizure circuit of the register, at make-before-break contacts 473 transfers from its operating circuit to "holding ground," at contact 475 prepares the operating circuit to the "pick up" relay 430, at break contact 476 opens the operating circuit to "transfer" relay 320, at make contact 478 closes the "interrupter start" circuit and at make contacts 471 and 472 prepares the line circuit for ringing and talking. As previously described, the "pick up" relay 430 operates, closing the circuit to the "code" relay 420 which follows the ring code and in turn operates the "drain" relay 410. The circuit for relay 460 is open at break contact 487 and since it is not operated, the code "R7" which was dialed, is sent out over the "+" line. Ringing now continues, and when the called party answers, ringing is stopped as before, either by the operation of the "ring cut-off" relay 450 or the "back-bridge" relay 350, dependent upon whether the called party answered on a ringing or silent period, and "ring-stop" relay 440 operates, thereby restoring relays 493 and 480, and in turn, relays 430, 420 and 410.

The "back-bridge" relay 350 upon operation over the called subscriber's loop, at make contact 352 closes the operating circuit to relay 240 over conductor 42, and at make contact 353 prepares a holding circuit to the "reverse battery" relay 260. Relay 240 upon operating, locks to "holding ground" by way of make contacts 242 and 255, at make contact 241 places "reverting call tone" from conductor 204 on the "−" talk conductor 35 and at make contact 243 closes the operating circuit to the upper winding of "reverse battery" relay 260.

The "reverting call tone" advises the called party of the nature of the call, so that he will remain on the line until the calling party again comes back on the line. This circuit extends from battery through the "reverting call tone" generator, not shown, conductor 204, make contacts 241 and 252, conductor 34, condenser 303, break contact 362, to the right on "−" line conductor 35, break contacts 412 and 422, make contact 472, conductor 36, break contact 512, make contacts 523 and 542, conductor 81, conductor 86, break contact 632, make contacts 654 and 604, line conductor 94, conductor 13, Figure 1, conductor 11, through the called telephone, where it is made audible in the receiver, back over the other side of the line to conductor 10, conductor 12, conductor 93, Figure 6, make contacts 603 and 653, break contact 631, conductor 96, make contact 621, conductor 85, conductor 80, make contacts 541 and 522, break contact 511, conductor 33, make contact 471, break contacts 421 and 411, conductor 32, break contact 361, winding "back-bridge" relay 350, to ground.

The reverting call timer represented by the rectangle 201, Figure 2, is common to the exchange and is started by the grounding of the "motor start" lead 70, Figure 4, as previously described. It will be noted that two timing conductors extend from the timer 201, namely the "TCO" or "time cut-off" conductor 205 and the "RTP" or "release trip pulse" conductor 206. Upon the starting of the timer, the "TCO" lead 205 normally has ground on it, which is removed momentarily every three seconds during the operation of the timer and the "RTP" lead 206 has ground placed on it momentarily every three seconds by the timer, shortly after the ground is replaced on the "TCO" lead. Figure 13 is a schematic chart which shows the opening and closing of the "TCO" and "RTP" which should further explain the above action.

The upper winding of the "reverse battery" relay now being connected to the "RTP" lead 206 by way of make contacts 243 and 258 this relay will operate from the ground pulse on "RTP" lead 206. Relay 260, upon operating close a holding circuit to its lower winding at make contact 264, to ground at make contact 256, at make-before-break contact 263, transfers the operating circuit for the connector relay 610, from direct ground to ground on the "TCO" lead 205, and at contacts 261 and 262, reverses the calling line talk conductors in the well known manner. Shortly less than three seconds after the operation of relay 260, ground is momentarily removed from the "TCO" lead 205, thereby opening the operating circuit to the connector relay 610. Relay 610 upon restoring, at contact 612 recloses a portion of the connector guard circuit over conductors 83 and 84 and at contact 611 removes hold ground from all the connector relays, thereby restoring relays 620, 650 and 600. Upon the restoration of the above relays, ground is removed from the line test conductor 95. The removal of this ground, which as previously, explained, held the link operated after the calling party hung up, opens the operating circuits to relays 120 and 130 in the line circuit 100, and the "hold slave" relay 310 in the selector. Relay 310, upon restoring at contact 315 removes ground from the "holding ground" conductor 26, thereby opening the operating and holding circuits of all the operated relays in the selector and finder thus restoring the link to normal so that it may receive further calls.

The "cutoff" relay 130 of the "line circuit" 100 restores and at its contacts 131 and 132 connects the "line" relay 110 back on the line. Relay 110, upon operating over the line loop, as previously explained, at make contact 112 places ground on the "CN" lead 14 thereby making the line busy to incoming calls, and at make contact 111 connects holding ground through make contact 121 to the "lockout" relay 120, which, being slow-to-release, has not restored during the interval ground was removed from the test conductor 14 and the operation of the "line" relay 110.

The "line" relay 110 now supplies talking battery to the line. The calling subscriber, after hanging up and waiting for a period of time long enough to allow ringng of the called party, now comes in on the line again and conversation may be had between the calling and called parties.

If the calling and called parties' ringers are on the same side of the line, that is both ringers connected to "—" line to ground, or both ringers connected to "+" line to ground, the calling party, after he has hung up, will hear the called party's ring on his own ringer and can determine when the called party has answered. However, if the calling and called parties' ringers are connected to the opposite sides of the line or harmonic ringing is used by the exchange, the calling party has no indication of the called party answering and, therefore, must wait a reasonable amount of time after hanging up before coming back on the line.

If the called party does not answer, the calling party may release the link by coming in on the line again and then hanging up. This, of course, is the same as though the called party had answered and the "back-bridge" relay operates and the same functions happen as described above. Upon the hanging up by the calling party the link is released and all relays again restore to normal. Also the "lockout" timer 301, as previously described, will release the link after a predetermined time if the called party does not answer and the calling party does not come in on the line again, and then hang up to release the link.

When both parties have completed their conversation and hung up, the line circuit 100 restores to normal by release of the "line" relay 110 and the subsequent release of the "lockout" relay 120. If only one party hangs up the line circuit will remain in the lockout condition until the second party hangs up.

*Trunk calls*

In this specification, it has been assumed that the trunks to a distant exchange terminate on a two-way repeater of the type described in Patent 2,491,291, issued to J. H. Voss et al. on December 3, 1949, Figures 19 and 20 and will not be described herein except in a manner in which it affects the operation of this invention. Other types of repeaters may be used, but for simplification of the specification will not be discussed.

These repeaters are arranged so that any local subscriber may seize and extend a call to a distant exchange, but are restricted to forwarding a maximum of four digits through the repeater and the call is also limited as to the length of conversation by a timer, which is common to all repeaters within the exchange. Other features of the repeater are; on calls from another trunk which are "switched through" the exchange to another exchange the restriction on the number of digits dialed remains, but the timing restriction is removed and on calls from a toll operator through the repeater, the restrictions on the number of digits dialed and the conversation timing are removed.

*Subscriber to trunk*

To make a call to a trunk, such as a direct trunk to a distant office, a calling subscriber, for example, the subscriber at station "A," dials a single digit number, in this case the digit "0" for an inter-office trunk. The trunk select relays in the group access relays represented by the rectangle 550 at the bottom of Figure 5, will thereupon act automatically to select an idle trunk in the trunk group dialed, in the same manner as a connector link was selected. Any subscriber may make a call on the trunk, but as previously mentioned, are restricted in the number of dialed digits that may be forwarded over the trunk and are also restricted as to the length of conversation, these restrictions being applied by the repeater, in the trunk circuit.

Assuming first, that the subscriber at station "A" on the line "105" is to make an inter-office call over a trunk. Upon the removal of the receiver or handset, the line equipment 100, the finder and allotter 190 and its associated selector link are affected exactly as described previously for a subscriber to subscriber call. Upon seizure of the calling line "105" by the finder-selector link, the "pulsing" relay 270 of the selector operates over the line loop, which in turn, operates "hold" relay 280 and "hold slave" relay 310, connecting ground on the test conductor 22 and ground on the "holding ground" conductor 26. Ground on the test conductor 22 also causes operation of the "cut-off" relay 130 and the "lockout" relay 120 of the calling line circuit 100, which releases the line relay 110, frees the finder control unit and advances the allotter to the next available idle link. The operation of the "hold slave" relay 310 in turn causes the seizure of an idle register associated with the finder-selector group and dial tone is extended out over the calling line.

When the calling party hears the dial tone he will dial a single digit corresponding to the trunk group wanted, in this case the digit "0." The "pulsing" relay 270 in the selector follows the pulses in the usual manner, to operate the counting relays in the seized register. On the first pulse "counting" relays 761 and 791 operate, on the second relays 762 and 792 operate, on the third relays 763 and 793 operate, on the fourth relays 764 and 791 operate, on the fifth relays 765 and 792 operate, on the sixth relays 766 and 793 operate, on the seventh relays 767 and 791 operate, on the eighth relays 768 and 792 operate, on the ninth relays 769 and 793 operate and on the tenth or last pulse, relays 760 and 791 operate, the last previously operated pair releasing, of course, at each step.

Shortly after the last pulse of the digit "0," "transfer" relay 320 restores. This relay, it will be remembered, is operated on the first pulse of the digit and due to its slow-to-release characteristics, remains operated for the duration of the pulsing. Relay 320, on releasing, at break contact 322 closes a multiple operating circuit to the "tens" relay 500 in the selector and the "TA" lead 60 into the group access relays 550. These circuits may be traced as follows; ground at make contact 315, through break contact 322, to the left over conductor 64, make contact 298, conductor 706, break contact 725, dividing, first; to the "first digit" group of contacts of the register "counting" relays, make contact 789, conductor 709, cable 714, make contact 217, conductor 567, cable 290, conductor 567, winding "tens" relay 500 to negative battery, and second; through make contact 784 of the register "counting control" relay 791, conductor 704, make contact 224, "TA" conductor 60, to the group access relays 550.

It should be brought out that all "tens" group relays in the selector, which are assigned to trunk service, are able to extend ground back through an associated "units" relay to relay 230. This ground connection is shown in Figure 5, on the moving contact arm of contact 501 of the "tens" relay 500, which for simplification of this specification is the only relay assigned to trunk service, and it follows that the other "tens" relays not assigned for trunk service will be unable to extend said ground back to relay 230. Also since connectors are not used on trunk calls, the selector "tens" relays assigned to trunk service do not control the connector access relays of Figure 11.

The "tens" relay 500, upon operating, at make contact 505 locks to "holding ground" conductor 26, at make contact 506 closes a circuit into the group access relays 550 by way of conductors 562 and 183, prepares the selector talking and test conductors and at make contact 501 prepares the operating circuit to the selector "switching" relay 230.

Upon the grounding of the "TA" conductor 60 and the closing of conductors 562 and 183, the group access relays 550 operate as before and assign an idle trunk to the selector. Thereupon, assuming the first trunk of the "0" group to be available, the 1–6 "units" relay 520 in the selector operates by way of the trunk select relays in 550, over conductor 561 in the usual manner.

The "units" relay 520 upon operating, at make contact 525 locks to "holding ground" conductor 26, and now extends the selector talking and test conductors through to the trunk line circuit 100′, Figure 1, and at the same time causes the operation of the selector "switching" relay 230 from ground at make contact 501, by way of make contact 521, and conductor 29. The "switching" relay 230 upon operating, at make contacts 231 and 232 switches the calling line through to the trunk over conductors 12′, 13′ and 14′ and the associated repeater 170 upon seizure, returns ground on the test conductor 17. Relay 230 also, at make-before-break contact 233 removes ground from break contact 263 by way of break contact 254, and connects ground extended from the repeater to the selector test conductor to maintain the calling line "cutoff" relay 130 and "lockout" relay 120 and the "hold slave" relay 310. The "cutoff" relay 130′ and "lockout" relay 120′ of the trunk line circuit 100′ also operate from this ground. Relay 230 further, at break contact 235 opens the holding circuit to the selector "connect" relay 290 and the register, Figures 7 and 8, which restores and is available for another call, and at break contacts 231 and 232 disconnects the selector "pulsing" relay 270 which in turn releases the "hold" relay 280. The link now is held operated by the repeater 170 by said ground on test conductor 17 and its functions may be traced as follows; ground on conductor 17 through break contact 112′ maintains the "cutoff" relay 130′ and the "lockout" relay 120′ operated; also this ground is extended over conductor 14′, make contacts 504 and 524, break contact 513, conductor 37, make contact 233, and dividing first to the right over conductor 22, make contact 311 to "hold slave" relay 310, to negative battery and secondly to the left over conductor 22, through the finder, conductor 30 to negative battery through the "cutoff" relay 130 and "lockout" relay 120 in series of the calling line circuit 100. "Hold slave" relay 310 maintains ground at contact 315 on the "holding" conductor 26, which maintains the "units" and "tens" relays of the finder and selector. The talking path of the connection described above is now free of all attachments in the finder and selector and may be traced as follows: subscriber's station over the line conductors 10 and 11, through the finder conductor 20 and 21, make contacts 231 and 232, conductors 33 and 36, break contacts 511 and 512, make contacts 522 and 523 and 502 and 503, conductors 12′ and 13′ to line circuit 100′ Figure 1, conductors 12′ and 13′, conductors 10′ and 11′ through the repeater 170 over the trunk conductors 15 and 16 to the distant office. The subscriber may now proceed as necessary to complete the call.

Calls from a subscriber to an operator or a toll operator are exactly as described above except that another single digit, other than "0," is dialed and a different selector "tens" relay is operated.

If all the trunks, say in the "0" group, were busy, ground would be extended from the group access relay 550 over the "ATB" or all trunks busy conductor 60′ to the lower winding of the "busy" relay 330, which operates and extends "busy-tone" to the called subscriber and releases the associated register as previously described.

*Trunk to trunk*

On calls from a distant office over an incoming trunk, which are to be switched through to another outgoing trunk, the operation is the same as that just described for a call from a subscriber to a trunk with the exception that the "trunk" relay 210 is operated, which in turn, through the group access relay 550, Figure 5, conditions the outgoing repeater so that timing restrictions are removed.

As described in the co-pending application Serial No. 720,756 filed, January 8, 1945, the "tens" relays of the alotter, assigned to incoming trunks, say for the purposes of this specification, from a distant exchange, will extend ground through the linefinder group restriction relays, not shown, to the "D" conductor 25 of the finder.

Therefore, when a call from a distant exchange is extended over the trunk, say conductors 15 and 16, Figure 1, the repeater represented by the rectangle 170, is seized and extends a loop circuit over line conductors 10′ and 11′ and through break contacts 131′ and 132′, operating the "line" relay 110′, which as previously described, starts and marks the linefinder, and the finder, upon finding the calling trunk, extends the talk and test conductors 10′, 11′ and 30′ through to the associated selector. The selector, upon seizure, and having connected to a free register, extends "dial tone" back over the trunk. At the same time the trunk has been found by the finder, ground over "D" conductor 25 operates the "trunk" relay 210 by way of its lower winding to negative battery. Relay 210 upon operating, at make contact 212, locks through its upper winding to ground on test conductor 22, at break contact 213 opens the operating circuit of "reverting call" relay 250, and at make contact 211 places ground on the "EC" conductor 31. The calling party, upon hearing dial tone, now dials the single digit which will forward the call through the exchange to an outgoing trunk. As previously stated this operation is identical to a subscriber trunk call and for sake of brevity will not be duplicated herein. At the time of seizure of the called outgoing trunk, the group access relays 550 extend the ground on the "EC" conductor 31 to the outgoing trunk repeater, which is assumed now to be repeater 170, Figure 1, over cable 18, operating a relay within the repeater 170, which locks to ground on the test conductor and also makes the conversation timer in the repeater ineffective. The call may now be extended, being restricted only to the dialing of not more than four digits.

It will be understood that the "trunk" relay 210 may be used to extend ground on the "EC" conductor 211 to control functions other than that described herein, such as restricted service for subscribers, etc.

*Toll to trunk*

On a call from a toll operator to an outgoing trunk, the operation is the same as for a call from a trunk to a trunk previously described with the addition of the operation of the "toll" relay 220 along with the "trunk" relay 210. Lines from a toll operator terminating on the linefinder will, upon the operation of the associated "tens" relays of the allotter and linefinder, have the "D" conductor 25 marked with ground and also a loop circuit will be closed consisting of "A" and "B" conductors 27 and 28 respectively. Thus upon seizure of a line from the toll operator position by the linefinder, the "trunk" relay 210 will operate and lock as previously described and will extend its locking ground to the "toll" relay 210, by way of "B" conductor 28, through the closed loop caused by the finder "tens" relay, back over "A" conductor 27, lower winding relay 220 to negative battery. The "toll" relay, upon operating, at make contact 222 locks to ground on the test conductor 22 by way of its upper winding, and at make contact 221 extends ground on "EC—1" conductor 30 to the group access relays 550. The toll operator, upon receiving dial tone, dials a single digit for the trunk and as previously described, the selector connects the calling line to an idle trunk. The extension of the ground placed on "EC—1" conductor 30 by the group access relay 550 to the seized repeater, causes relays in the repeater to remove the digit and timing restrictions as described in the copending application Serial No. 720,756 filed January 8, 1945.

*Toll to subscriber*

On a call from a toll operator to a subscriber, the operation is similar to that just described for a subscriber to subscriber call, with the exception that the toll operator has monitoring and camp-on-busy facilities.

Assuming, for example, that a toll operator's line terminates on the line circuit 100, Figure 1, although it may terminate on a trunk and repeater circuit like 170. Upon seizure of the line by the toll operator, "line" relay 110 operates and as described previously, marks the linefinder and its associated allotter. The linefinder, upon finding the calling line which the toll operator is assigned, extends the talk and test conductors 10, 11, and 30 into the associated selector and as described, grounds the "D" conductor 25 and closes the loop of "A" and "B" conductors 27 and 28. The "trunk" relay 210 operates from ground on the "D" conductor and at break contact 213 opens the circuit to the "reverting call" relay 250, at make contact 212 locks its upper winding to ground on the test conductor 22 and extends its locking ground over the closed loop of the "A" and "B" conductors 27 and 28 to operate the "toll" relay 220 by way of its lower winding. Relay 220, upon operating, at make contact 222 locks to ground on the test conductor by way of its upper winding, at make contact 223 prepares an operating circuit for the "toll digit" relay 370 and at make contact 221 grounds the "EC—1" conductor 30, which in this case will not be used.

The selector associated with the linefinder now seizes an idle register and dial tone is extended back to the toll operator, informing her that the link is ready to receive dial pulses. The operator now dials the called subscriber's number and, if the line is free, the selector "cut-thru" relay 470 will operate and ringing will commence. The called part upon answering, operates the "back-bridge" relay 350, which in turn operates the "reverse battery" relay 260, thus reversing the talk conductors in the well known manner and gives answering supervision to the toll operator. Conversation can now proceed.

However, if the called line is busy, the "busy test" relay 620 in the connector will encounter ground on the test conductor and will not operate and after the third digit has been dialed and the "third digit transfer" relay 810 of the register operates, the "busy check" relay 820 will shortly restore and at contact 821 complete the operating circuit for the upper winding of the "busy" relay 330 to negative battery through the protective resistor 99 at contact 621.

The "busy" relay 330, upon operating, at contact 331 places busy tone back over the line indicating to the toll operator the condition of the called line, at make contact 332 prepares the operate circuit to "pulse" transfer relay 340, at make contact 333 closes a locking circuit to its upper winding, at make contact 335 prepares the operating circuit to the "toll monitor" relay 360, at make contact 336 further prepares the operating circuit to the "toll digit" relay 370 and at make contact 337 closes a locking circuit to its lower winding by way of ground at make contact 314, break contact 365, conductor 54, break contact 259, conductor 53, make contact 337, lower winding relay 330 to negative battery.

The toll operator, upon receiving busy tone, may now at her discretion, release the call or she may dial the fourth digit to allow her to monitor the busy subscriber's line.

Assuming that the toll operator elects to dial the fourth or ring digit after receiving busy tone, one or two of the "ring storage" relays 480, 481, 482 or 483 will be operated in accordance with the digit dialed. Now assuming that "ring storage" relay 483 is operated, it will at make contact 485 forward "holding ground" from conductor 64 over conductor 77 and make contact 332 to operate the "pulse transfer" relay 340. Relay 340, upon operating, at break contact 342 opens the "holding ground" circuit to the register, thereupon releasing it and making it free for further seizure and at contact 341 transfers the now open pulsing circuit from the register "counting" relays to the "toll digit" relay 370. The toll operator, by dialing an extra digit "1," may now cut in on the busy connection and offer the call or monitor the call. The selector "pulsing" relay 270 responds in the usual manner and passes one pulse to the "toll digit" relay 370, over the following circuit; ground at break contact 382, conductor 47, break contact 271, make contact 282, conductor 50, make contact 341, conductor 49, make contact 223, conductor 48, make contact 336, break contact 364, winding relay 370, to negative battery. Relay 370, upon operating, extends its operating ground through make contact 371, winding "verification" relay 360, to "holding ground" at make contact 335. Relay 360, being shunted by ground on each side of its winding will not operate; however, when the "pulsing" relay 270 reoperates after the digit "1" has been dialed, the operating ground circuit to the "toll digit" relay 370 is opened at make contact 271 and "toll monitor" relay 360 will operate, over the above traced path, in series with "toll digit" relay 370 to negative battery through the winding of relay 370. The "verification" relay 360, upon operating, at break contact 364, opens the operating circuit of the "toll digit" relay 370, at break contact 363 opens the circuit to the "time lockout" relay, at break contact 362 opens the busy tone circuit, and at make contacts 361 and 362 closes a "dry" talking circuit through to the busy line which may be traced from the toll operator's line 10 and 11, through the linefinder, conductors 20 and 21, break contact 231 and 232, and 251 and 253, talking condensers 202 and 203, conductors 32 and 35, make contact 361 and 362, talking condensers 304 and 305, conductors 33 and 36, contacts of the selector "units" switching "units" and "tens" relays which have been operated into the connector through the "by-pass" condenser 98 in the "+" talking conductor, contacts of the connector "units switching" relay, "units" relay and "tens" relay which have been operated, to the called line. The toll operator may now "monitor" the called line or converse with the called subscriber and offer the call. If the call is accepted, the conversing parties hang up, and negative battery replaces ground on the connector test conductor, being fed from the "lockout" and "cutoff" relays in series of the called line "line circuit." The connector "busy test" relay 620 then operates and as previously described opens the operating circuit to the "busy" relay 330, by removing negative battery through the protective resistor 99 from the "+" conductor and prepares the called line for ringing. The "busy" relay 330 restores, and at contact 332 opens the circuit to "pulse transfer" relay 340 and closes the operating circuit to the "cut-thru" relay 470. Relay 340 restores and relay 470 operates, closing the called line circuit for ringing. The dialed ringing code is now sent out over the called line, and when the called subscriber answers, the connection is completed in the regular manner.

The above "camp-on-busy" feature, wherein the called line can be seized immediately after the line becomes idle, may not always be desirable, therefore, when this feature is not wanted, "strap" connection 306, Figure 3, is used which maintains the holding circuit of the "busy" relay 330 closed through its lower winding, irrespective of the operation of the "verification" relay 360, opening said circuit at break contact 365.

The "verification" relay 360 is also used by the toll operator to verify the call number of the line of the calling subscriber wishing to make a toll call. After receiving the number of the calling party, the toll operator dials this number back over a different link, and upon receiving the busy signal dials the extra digit "1" and asks the calling subscriber to hang up for a moment. This permits the new call to switch through and the toll operator then frees the first link. In this way, subscribers are prevented from cheating by giving the wrong number for the originating station.

The invention having now been described, what is considered new and is desired to have protected by Letters Patent is set forth in the claims following.

I claim:

1. In an automatic telephone system, subscriber lines, a plurality of connector switches, a plurality of register switches, counting relays in said register switches operated in response to dial pulses of a series of transmitted digits, storing relays in said register switches for storing one of said digits, a group of connector access relays comprising a relay individual to each connector switch, common connections conecting said group of connector access relays to said pluraity of registers, means in one of said register switches to render one of said connector access relays operative to connect its associated connector over said common connections to said one register after receipt of a subsequent transmitted digit on said counting relays of said one register, and relays in said one connector operated simultaneously in accordance with the digit stored in said one register and the subsequent digit received on said counting relays therein for completing a connection to a subscriber's line corresponding to said transmitted digits.

2. An automatic telephone system as claimed in claim 1 including; means in said one register rendering said common connections inoperative to all other said registers after receipt of the subsequent transmitted digit.

3. An automatic telephone system as claimed in claim 1 including; means in said one register responsive to the operation of said relays in said one connector for causing said one register to render said common connections operative to all other said registers.

4. In an automatic telephone system, subscriber lines, selectors and connectors, a control unit common to a plurality of said selectors and to all of said connectors, relay means in one of said selectors for connecting said control unit to said one selector in response to the extension of a call to said one selector, counting relays in said control unit responsive to dial pulses of a series of transmitted digits for causing said one selector to connect with an idle one of said connectors in accordance with an after receipt of the first transmitted digit of said series, means in said control unit for storing the second digit of said series received by said counting relays, means responsive after receipt of the third transmitted digit of said series to cause said one connector to connect with a called subscriber's line in accordance with said transmitted second and said third digits, ring storage relays in said one selector, means in said control unit after receipt of the fourth digit of said series to cause operation of certain of said ring storage relays in said selector, means in said selector controlled by the operated ones of said ring storage relays for connecting coded ringing signals to said called line if idle and means in said one selector upon operation of said certain ring storage relays for freeing said control unit.

5. An automatic telephone system as claimed in claim 4 including; means in said selector for stopping said ringing signals and freeing said one selector and said one connector after a predetermined time in case the call is not answered.

6. In an automatic telephone system, subscriber lines, a plurality of connector switches, a plurality of selector switches, said selectors divided into a plurality of selector groups with a plurality of selectors in each group, a plurality of register switches, said registers divided into a plurality of register groups with a plurality of register switches in each group, each said register group associated with one of said selector groups, a group of connector access relays comprising a relay individual to each said connetcor switch, common connections connecting said group of connector access relays to said plurality of registers, means in one of said selectors for seizing an idle register within said associated group in response to the extension of a call to said one selector, counting relays in each register switch, storing relays in each register switch for storing one digit, means in said seized register switch upon receipt by said counting relays of the first digit of a transmitted series to cause said one selector to connect with an idle one of said connector switches, means in said seized register switch for storing the second digit of said series received by said counting relays, means in said seized register switch to render operative one of said connector access relays associated with said one connected connector switch over said common connections to said seized register after receipt of the third digit of said series on said counting relays, relays in said connected connector operated simultaneously in accordance with the stored second digit in said register and the third digit received on said counting relays to cause said connected connector to connect with the called subscriber's line in accordance with said second and third digits, ring storage relays in said one selector, means in said register switch responsive after receipt of the fourth digit of said series to cause operation of certain of said ring storage relays in said one selector, means controlled by said operated ring storage relays for connecting coded ringing signals to said called line if idle, and means in said selector switch responsive to the operation of certain ring storage relays for freeing said register switch.

7. In an automatic telephone system, subscriber lines, selectors and connectors, a control unit common to a plurality of said selectors and to all of said connectors, relay means in each selector for connecting said control unit to the corresponding selector in response to the extension of a subscriber call to such selector, counting relays in said control unit responsive to dial pulses of a series of transmitted digits for causing said connected selector to connect with an idle one of said connectors in accordance with and after receipt of the first transmitted digit of said series, means in said control unit for storing the second digit of said series received by said counting relays, means responsive after receipt of the third digit of said series by said counting relays to cause said connector to connect with a called subscriber's line in accordance with said second and said third digit, and relay means in said selector operated responsive to connection with a busy subscriber line to cause busy signals to be given to the calling line.

8. An automatic telephone system as claimed in claim 7 including; an automatic timing means for forcing disconnection of said selector and said connector and said control unit in case the calling party does not hang up promptly upon hearing said busy signals.

9. In an automatic telephone system, subscriber lines, a selector and a connector of the relay type, group and unit relays in said selector and said connector for making connections between said lines, a control unit common to said selector and said connector, means for temporarily connecting said control unit to said selector and to said connector during the establishment of a connection between a calling one of said lines and a called one of said lines, a line relay in said selector, and means in said control unit responsive to impulses from said calling line repeated to said control unit by said line relay for operating the group and units relays in said selector and subsequently in said connector to complete the call from said calling line to said called line.

10. An automatic telephone system as claimed in claim 9 including; means for freeing said control unit from said selector and connector after operation of said relays.

11. An automatic telephone system as claimed in claim 9 including; means for freeing said control unit automatically after a given time interval in case a call is not completed promptly through said selector or said connector.

12. In an automatic telephone system, subscriber lines, automatic selectors and connectors of the relay type, group and unit relays in said selectors and connectors for making connections between said lines, a control unit common to all said connectors and common to a plurality of said selectors, means for seizing one of said plurality of selectors in response to the initiation of a call over a calling one of said lines, means for temporarily connecting said control unit to said one selector in response to said seizure, means in said control unit responsive to line impulses repeated thereto by said selector under control of said calling line for operating one of the group relays and one of the unit relays in said one selector to seize an idle one of said connectors, means for temporarily connecting said control unit to said one connector in response to said last seizure, and means in said control unit responsive to further line impulses repeated thereto by said selector under control of said calling line for operating one of said group relays and one of said unit relays in said one connector to complete a connection to a called line.

13. In an automatic telephone system, subscriber lines and trunks, selectors and connectors of the all-relay type for establishing connections to said subscriber's lines and said trunk lines, impulse responsive control equipment common to said selectors to control the operation of the relays in said selectors in response to incoming impulses repeated to said control unit by said selector to extend connections to any of said trunk lines and to any of said connectors depending on the first digit dialed, said control equipment common to said connectors to control the operation of the relays in said connectors in response to the subsequent digits repeated to said control unit by said selector to extend a connection intended for a subscriber's line, and means for temporarily connecting said common control equipment to one of said selectors only during the establishment of a trunk connection and to one of said selectors and to one of said connectors during the establishment of a connection.

14. In an automatic telephone system, subscriber lines, a selector and a connector of the all-relay type, a control unit common to said selector and connector switches, means including said common control unit, said selector and connector switches for extending a call from a calling one of said subscriber lines to a called one of said subscriber lines, a pair of talking conductors comprising a positive and a negative talking conductor extended through said selector and connector switches to said called line, a relay in said control unit having contacts, a relay in said selector connected between said contacts of said control unit relay and the positive conductor of said pair of talking conductors, means in said connector switch whereby negative potential is maintained connected to said positive conductor when said called line is busy, means for deenergizing said control unit relay after said connector switch has extended said pair of conductors to said called subscriber's line to connect positive potential to said selector relay to thereby complete an operating circuit therefor, including said positive conductor to said negative potential, and means controlled by the operation of said selector relay for extending busy tone to the calling subscriber.

15. In an automatic telephone system, subscriber lines, means for extending a talking circuit between a pair of said lines including a selector switch, a connector switch and a common control unit, circuits for operating said switches from said control unit in response to line impulses passed to said control unit by said selector, a test relay in said connector, a control relay in said unit and a busy relay in said selector, a circuit for operating said busy relay including contacts on said control relay and contacts on said test relay, a source of current, said busy relay circuit connected to one potential of said source over one conductor of said talking circuit by the contacts of said test relay only when the called line is found busy and connected to another potential of said source by the contacts of said control relay when the called line is found, and said busy relay operated over said conductor by said potentials when said line is found busy to signal the calling one of said subscribers.

16. In an automatic telephone system, subscriber lines, means including a selector switch, a connector switch and a control unit normally disconnected from said switches for extending a calling one of said lines to a called one of said lines, circuits for operating said switches from said control unit in response to line impulses passed thereto by said selector, a test relay in said connector operative only in case the called line is found idle, a busy relay in said selector operative in case the called line is found busy to transmit a busy tone to the calling line, a control relay in said control unit operative after extension of the calling line to said called line, and a circuit for operating said busy relay including contacts on said control relay and contacts on said test relay completed only when said test relay is found unoperated following the extension of a connection.

17. In a telephone system, subscriber lines, selectors and connectors of the all-relay type, group and units relays in said selectors for completing connections to idle ones of said connectors and group and unit relays in said connectors for completing connections to called ones of said lines, means responsive to the initiation of a call on one of said lines for seizing an idle one of said selectors, a control unit common to said one selector and all said connectors connected to said one selector in response to said seizure, means in said control unit controlled over said calling line for operating certain of said group and unit relays in said one selector to seize an idle one of said connectors and for thereafter operating certain of said group and unit relays in said one connector to extend the calling line to a called one of said lines, a test relay in said one connector, a busy relay in said one selector, a control relay in said control unit, a circuit including contacts on said test relay and contacts on said control relay for operating said busy relay in case said called line is busy, and means controlled by the operation of said busy relay for transmitting a busy tone to said calling line.

18. In a telephone system, subscriber lines, selector and connector switches of the all-relay type, group and unit relays in said switches for extending calls, a common control unit common to said switches, group access and trunk selecting relays for controlling the operation of said unit relays in said selector switches, means responsive to the initiation of a call on a calling one of said lines for seizing an idle one of said selector switches and for connecting said common control unit to said seized selector; means in said common control unit responsive to a series of dialed digits transmitted from said calling line for operating one of said group relays in said seized selector switch in accordance with the first digit of said transmitted series in response to the receipt thereof, for operating said group and access trunk selecting relays to operate one of the unit relays in said seized selector to seize an idle one of said connector switches in response to the receipt of said first digit, for storing the second digit of said transmitted series in response to the receipt thereof, and for operating one of the group relays in said seized connector in accordance with said second stored digit and one of said unit relays therein in accordance with the third digit of said transmitted series in response to the receipt of said third digit; and contacts on said operated group and units relays for completing a connection from said calling line to a called line.

19. In a telephone system, subscriber lines having hundreds, tens and unit digit designations in their called telephone numbers, a plurality of selectors and a plurality of connectors, means for seizing an idle one of said selectors in response to the initiation of a call on one of said lines, a common control unit common to said selectors and connectors connected to said seized selector in response to the seizure of said selector, means for transmitting the hundreds, tens and units digits of a called line's telephone number to said common control unit, means in said control unit responsive to the receipt of said hundreds digit for transmitting a corresponding hundreds indication to said selector thereby operating said selector to seize an idle one of said connectors in accordance with said hundreds indication, normally open common connections extending from said control unit to all said connectors, means individual to said seized connector operated after the receipt of said units digit by said control unit for closing said common connections to said seized connector, means in said control unit responsive to the closing of said common connections for transmitting tens and units indications over said common connections corresponding to said tens and units digits to said seized connector, and means in said connector responsive to said transmitted tens and units indications for operating said connector to connect with said called line.

20. A telephone system as claimed in claim 19 including; means controlled over said common connections by the operation of said connector for opening said common connections.

21. A telephone system as claimed in claim 19 including; means operative in case the called line is idle for releasing the common control unit.

22. In a telephone system, subscriber lines, stations on said lines each having four digit number designations in their called telephone numbers, a plurality of selectors and a plurality of connectors, means for seizing an idle one of said selectors in response to the initiation of a call on one of said lines, a common control unit common to said selectors and said connectors connected to said seized selector in response to the seizure of said selector, means for transmitting four digits of a called station's telephone number on one of said lines to said common control unit, means in said control unit responsive to the receipt of the first of said digits for transmitting a corresponding indication to said selector thereby operating said selector to seize an idle one of said connectors in accordance with said transmitted indication, means in said control unit responsive to the receipt of the third of said digits for transmiting indications corresponding to said second and third digits to said seized connector thereby operating said connector to extend the call to the called line, and means in said control unit responsive to the receipt of the fourth digit of said digits for transmitting a corresponding indication to said selector thereby conditioning said selector to selectively signal the desired station on said called line.

23. A telephone system as claimed in claim 22 including; switching devices in said connector operated in response to the transmission of said transmitted indications corresponding to said second and third digits for extending the call to the called line, means responsive to the operation of said switching devices for erasing said transmitted indications corresponding to said second and third digits, and means for maintaining said switching devices in operated condition after said erasing operation.

24. In a telephone system, subscriber lines each having tens and units number designations in their called telephone numbers, a connector switch of the all-relay type, group relays corresponding to said tens number designations in said connector switch, unit relays corresponding to said unit number designations in said connector switch, means for seizing said connector in response to the extension of a call, a control unit for said connector responsive to the receipt of the tens and units digits corresponding to the tens and units number designations of a called one of said lines for simultaneously operating the group relay corresponding to transmitted tens digit and the units relay corresponding to the transmitted units digit, and contacts on said operated group and units relays for extending the call to said called line.

25. In a telephone system, subscriber lines, a plurality of groups of registers for registering the telephone numbers of called subscriber lines, a plurality of groups of connectors for completing connections to called ones of said lines, a plurality of control conductors extending from each register in each register group to each connector in each connector group, a relay in each register, a relay individual to each connector, contacts on said relays terminating said control conductors, means for operating one of said register relays and the individual relay of one of said connectors to operatively connect only one of said registers to only one of said connectors over said operated relay contacts and said control conductors, and means for thereafter operating said one connector over said control conductors from said register corresponding to the operated register relay to complete a connection to a called one of said lines.

26. A telephone system as claimed in claim 25 including; means responsive to the operation of said one connector for releasing said operated relays to operatively disconnect said control conductors from said one register and said one connector.

27. A telephone system as claimed in claim 25 including; release means in said one register for releasing said operated relays, and means in said one connector responsive to the operation of said connector for operating said release means over one of said control conductors.

28. A telephone system as claimed in claim 25, including; a chain circuit interconnecting all said registers in all said groups, and contacts on said register relays for controlling said chain circuit to prevent the operation of a second one of said register relays after one of said register relays is operated.

29. In an automatic telephone system, a plurality of connector switches, a plurality of register switches for receiving a series of dialed digits, a group of connector access relays comprising a relay individual to each connector switch, common connections extending from said group of connector access relays to said plurality of registers, means in a register switch responsive after receiving the third digit of said series of digits for operating one of said connector access relays, and means controlled by said operated connector access relay for connecting said common connections to the corresponding connector switch.

30. In an automatic telephone system, a plurality of connector switches, a plurality of register switches for receiving a series of dialed digits, said registers divided into a plurality of register groups with a plurality of registers in each group, a group of connector access relays comprising a relay individual to each connector switch, common connections connecting said group of connector access relays to said plurality of registers, means in any one of said register switches responsive after receiving the third digit of said series of digits for operating one of said connector access relays, means controlled by said operated connector access relay for connecting said common connections to one of said connector switches, and means in said register for rendering said common connections inoperative to all other said registers.

31. In an automatic telephone system, a plurality of subscriber stations, a plurality of selector switches, a group of relays in each selector, groups of connector switches accessible to said selector switches, a plurality of register switches, means whereby one of said selector switches seizes an idle register switch, a group of counting relays in said register switch for operating a particular relay in the relay group of said selector switch to select a corresponding group of connector switches in response to the dialing of one of the digits of the called subscriber's number, a group of unit relays and a unit switching relay in said selector switch, each said unit relays being operative to select either of two different connector switches in the selected group, dependent upon the operated or non-operated condition of said unit switching relay, trunk selecting relays operative in response to operation of said particular selector relay to select one of said connector switches in the selected group by operating said unit switching relay and one of said unit relays, said trunk selecting relays also being operative to select another of said connector switches in the selected group by operating said one unit relay without operating said unit switching relay, and means for operating a relay in said register responsive to operation of said particular selector relay and said unit relay or said unit relay and said units switching relay to deenergize said group of counting relays in said register.

32. In an automatic telephone system, subscriber party lines, all-relay selector and connector switches for making connections between said subscriber lines, multi-contact relays in said switches, a control unit common to all of said switches, means for connecting said control unit to a seized switch of each type during the extension of a connection, subscriber controlled impulse responsive means in said control unit for selectively operating certain of said multi-contact relays in said seized switches to extend a call to a called line, a code signal device in said selector controlled from said impulse responsive means for signalling the called line, and means for disconnecting the control unit from said seized switches before said signalling starts.

33. In an automatic telephone system, subscriber lines, a plurality of selector switches, said selectors divided into a plurality of selector groups with a plurality of selectors in each group, tens and units relays in each selector, a plurality of register switches, said register switches divided into a plurality of groups of registers with a plurality of registers in each group, each register group being associated with a selector group and the number of said register switches in a register group being less than the number of said selector switches in said associated selector group, a plurality of connector switches, a group of connector access relays comprising a relay individual to each connector switch, common connections connecting said group of connector access relays to said plurality of registers, counting relays in said register switches operated in response to dialed pulses of a series of transmitted digits, storing relays in said register switches for storing one of said digits, means responsive to a call for seizing one of said selectors and for connecting an idle register switch with said seized selector, means responsive to the receipt of the first digit of said series by said counting relays in said one register switch for operating the tens and units relays in said selector in accordance with said first digit to extend said subscriber's line to one of said connector switches, means responsive to the operation of said tens and units relays for causing said counting relays to restore, means responsive to the receipt of the second digit of said series by said counting relays to operate certain ones of said storing relays in accordance with said second digit, means responsive to the operation of said storing relays for causing said counting relays to restore, means responsive to the receipt of the third digit of said series by said counting relays for operating one of said connector access relays to connect its associated connector over said common connections to said register, tens and units relays in said connector operated simultaneously in accordance with said second digit stored by said storing relays and in accordance with said third digit received by said counting relays to extend said subscriber's line to a called line, means responsive to the operation of said tens and units relays in said connector for causing said counting and storing relays to restore, ring storage relays in said one selector, means responsive to the receipt of the fourth digit of said series by said counting relays for operating one or more of said ring storage relays in said selector in accordance with said fourth digit, means for connecting ringing signals to said called line, if idle, in accordance with the operation of said ring storage relays, means in said selector responsive to the operation of said ring storage relays for freeing said register switch, and means for completing a speech circuit in response to the called party answering.

34. In an automatic telephone system, subscriber lines, finder, selector, connector and register switches, means in said finder switch for seizing a calling subscriber's line and extending the same to an idle selector switch, means in said selector switch upon extension of said calling line for seizing an idle register switch common to said selector switches and said connector switches, means in said register switch upon receipt of dialed impulses from said calling subscriber for causing said selector switch to extend said calling line to an idle connector switch in accordance with said dialed impulses received by said register switch, means in said selector switch for holding operative said finder, register and connector switches, means in said register for causing said connector switch to connect said calling line to a called subscriber's line in accordance with subsequent dialed impulses received by said register switch, means in said register switch after receiving further dialed impulses for causing said selector to signal said called line, means in said selector operative during signalling operation for freeing said register switch, means in said selector responsive to the answering of said signal by said called subscriber for completing a speech transmission circuit between said calling and called subscriber's lines and for supplying transmission potential thereto, and means in said selector for freeing said finder, selector and connector switches to terminate said call.

35. In a telephone system, a plurality of groups of connectors, a plurality of connectors in each group, a plurality of selectors having access to said connectors, a plurality of connector tens marking conductors corresponding in number to the number of connector groups normally connected to each of said selectors, a plurality of connector units marking conductors corresponding in number to the number of connectors in any one connector group normally connected to each of said selectors, a relay individual to each connector connected to the tens marking conductors corresponding to the connector group of the corresponding connector and connected to the units marking conductor corresponding to the units location of said corresponding connector in its connector group, a plurality of common control units common to said selectors, means for seizing one of said selectors and for connecting one of said common control units to said seized selector, register tens marking conductors extending from each common control unit, register units marking conductor extending from each common control unit, relays in said seized selector operated by said connected control unit to select an idle connector in one of said connector groups, means in said connected control unit for marking one of its said register tens marking conductors and one of its said units marking conductors, contacts on said operated selector relays for connecting a marking to one of said connector tens marking conductors and to one of said connector units marking conductors corresponding to the seized connector to thereby operate the corresponding individual connector relay, common connections extending from all said common control units to all said individual connector relays, means for connecting said marked register tens and units marking conductors to said common connections, contacts on said operated individual connector relay for connecting said common connections to said seized connector, and means in said connected common control unit for operating said seized connector over said marked register marking conductors, said common connections and said contacts on said operated individual connector relay.

36. In a telephone system, a plurality of groups of connectors, a plurality of connectors in each group, a plurality of selectors having access to said connectors, a plurality of connector tens marking conductors corresponding in number to the number of connector groups normally connected to each of said selectors, a plurality of connector units marking conductors corresponding in number to the number of connectors in any connector group normally connected to each of said selectors, a relay individual to each connector connected to the tens marking conductor corresponding to the connector group of the corresponding connector and connected to the units marking conductor corresponding to the units location of said corresponding connector in its connector group, means for seizing one of said selectors, means for operating said one selector to select one of said connector groups and to seize an idle one of said connectors in the selected connector group, means in said one selector for operating the individual connector relay corresponding to said seized connector over one of said tens and one of said units marking conductors, and circuits controlled by said operated individual connector relay over which said seized connector is operated.

37. In a telephone system, lines, selectors and connectors for inclusion in serial relation for extending calling lines to called lines, means for seizing one of said selectors in response to the initiation of a call on a calling one of said lines, tens and units relays in said seized selector operated in response to impulses received during the extension of the call for seizing one of said connectors, tens and units relays in said seized connector operated in response to further impulses received in the further extension of said call to seize a called one of said lines, a busy relay in said selector, means for transmitting a busy tone to said calling line by operation of said busy relay in case the called line is busy, a monitoring circuit in said selector, and means controlled by the calling line for completing said monitoring circuit in response to other impulses received from said calling line following said transmission of said busy tone to connect said calling line to said busy called line.

38. In a telephone system as claimed in claim 37, wherein said last mentioned means includes a special service relay in said selector operative only in case the calling line is entitled to special services and a monitor relay in the selector under control of said special service relay and operated in response to said other impulses received from said calling line to complete said monitoring circuit in said selector.

39. In a telephone system, subscriber lines, selectors and connectors for inclusion in serial relation for extending calling lines to called lines, means for seizing one of said selectors in response to the initiation of a call by a calling line, tens and units relays in said seized selector operated in response to the extension of said call for seizing one of said connectors, tens and units relays in said seized connector operated in the extension of said call to seize a called one of said lines, a source of signalling current in said selector, means for signalling said called line from said source in case the called line is idle, a busy tone source in said selector, means for transmitting a busy tone from said busy tone source to the calling line in case the called line is busy, and talking battery bridges in said selector for feeding talking battery to both said calling and called lines upon completion of said connection between said calling and called lines.

40. A telephone system as in claim 13 including; means for freeing said control equipment from said selector and said connector responsive to the establishment of a connection to a subscriber line, and means for freeing said control equipment from said selector immediately responsive to the establishment of a connection to a trunk.

41. In a telephone system, groups of subscriber lines, corresponding groups of connector switches having access to said lines, a plurality of groups of selector switches having access to said connectors, a plurality of groups of registers corresponding to said selector groups for respectively controlling the operation of the selectors of the corresponding selector group, said registers normally disconnected from said switches, and each said register arranged for also controlling the operation of any one of said connectors, a chain relay circuit interconnecting all of said registers, means for selecting one each of said selectors and connectors for operation on a call, means for connecting a register to said selected switches, and means including said chain circuit for causing only one of said registers to be connected to only one of said connectors at any given time.

42. A telephone system as in claim 41 including; a second chain relay circuit interconnecting the registers of one of said register groups, and means including said chain circuit for causing only one of said last named registers to be connected to only one of the selectors of the corresponding selector group at any given time.

ROY W. JONES.

REFERENCES CITED

The following references are of record in the file of this patent:

UNITED STATES PATENTS

| Number | Name | Date |
|---|---|---|
| 1,849,088 | Hovland | Mar. 15, 1932 |
| 1,857,833 | Baker | May 10, 1932 |
| 2,177,079 | Saunders | Oct. 24, 1939 |
| 2,239,902 | Peterson | Apr. 29, 1941 |
| 2,279,531 | Saunders | Apr. 14, 1942 |
| 2,333,038 | Voss | Oct. 26, 1943 |
| 2,431,851 | Voss | Dec. 2, 1947 |